US012077215B2

(12) United States Patent
Godthi et al.

(10) Patent No.: US 12,077,215 B2
(45) Date of Patent: Sep. 3, 2024

(54) STRUCTURAL BODIES FOR VEHICLES HAVING HONEYCOMB INSERTS AND METHODS OF MAKING AND USING SAME

(71) Applicant: SHPP GLOBAL TECHNOLOGIES B.V., Bergen op Zoom (NL)

(72) Inventors: Vamsy Godthi, Bangalore (IN); Somasekhar Bobba Venkat, Bangalore (IN); Harindranath Sharma, Bangalore (IN); Arunachala Parameshwara, Bangalore (IN); Dinesh Munjurulimana, Wixom, MI (US)

(73) Assignee: SHPP GLOBAL TECHNOLOGIES B.V., Bergen op Zoom (NL)

( * ) Notice: Subject to any disclaimer, the term of this patent is extended or adjusted under 35 U.S.C. 154(b) by 181 days.

(21) Appl. No.: 17/608,080

(22) PCT Filed: Jun. 5, 2020

(86) PCT No.: PCT/US2020/036319
§ 371 (c)(1),
(2) Date: Nov. 1, 2021

(87) PCT Pub. No.: WO2020/247745
PCT Pub. Date: Dec. 10, 2020

(65) Prior Publication Data
US 2022/0315114 A1    Oct. 6, 2022

(30) Foreign Application Priority Data

Jun. 7, 2019 (EP) .................................... 19178988

(51) Int. Cl.
*B62D 25/20* (2006.01)
*B62D 21/15* (2006.01)
(Continued)

(52) U.S. Cl.
CPC ........... *B62D 25/20* (2013.01); *B62D 21/157* (2013.01); *B62D 25/02* (2013.01); *B62D 25/025* (2013.01); *B62D 25/04* (2013.01); *B60Y 2306/01* (2013.01)

(58) Field of Classification Search
CPC ...... B62D 25/025; B62D 25/02; B62D 25/04; B62D 25/20; B62D 21/157; B60Y 2306/01
(Continued)

(56) References Cited

U.S. PATENT DOCUMENTS 3,200,489 A * 8/1965 Keeleric .................. B31D 3/02
                                                      428/116
5,277,958 A * 1/1994 Tomkins ................. E04C 2/365
                                                      428/116
(Continued)

FOREIGN PATENT DOCUMENTS

DE    102017005938 B3    12/2018
JP    H06226891 A        8/1994
(Continued)

OTHER PUBLICATIONS

Extended European Search Report for EP Application No. 19178988. 2; dated May 18, 2020; 10 pages.
(Continued)

*Primary Examiner* — Dennis H Pedder
(74) *Attorney, Agent, or Firm* — CANTOR COLBURN LLP

(57) ABSTRACT

An energy absorbing device includes a honeycomb body having two or more tubes stacked transversely with one another along a longitudinal axis. The honeycomb body includes an inboard portion and an outboard portion. The inboard portion of the honeycomb body is arranged along the longitudinal axis and has an inboard portion bending
(Continued)

stiffness. The outboard portion of the honeycomb body is arranged outboard of the longitudinal axis, is coupled to the inboard portion of the honeycomb body, and has an outboard portion bending stiffness. The outboard portion bending stiffness of the outboard portion is greater than the inboard portion bending stiffness of the inboard portion. Structural members for vehicle bodies and vehicle bodies are also described.

20 Claims, 15 Drawing Sheets

(51) Int. Cl.
  *B62D 25/02* (2006.01)
  *B62D 25/04* (2006.01)
(58) Field of Classification Search
  USPC ....... 296/193.06, 209, 210, 203.03; 293/102, 293/120; 188/371, 376, 377
  See application file for complete search history.

(56) References Cited

U.S. PATENT DOCUMENTS

| | | | |
|---|---|---|---|
| 6,004,066 A | 12/1999 | Niemerski | |
| 8,474,583 B2 * | 7/2013 | Nagwanshi | B60R 19/34 188/371 |
| 8,864,216 B2 | 10/2014 | Nagwanshi et al. | |
| 9,779,715 B1 | 10/2017 | Seldal | |
| 10,479,413 B1 * | 11/2019 | Woods | B62D 29/005 |
| 2002/0050420 A1 * | 5/2002 | Porte | F02K 1/827 181/292 |
| 2012/0153669 A1 | 6/2012 | Nagwanshi et al. | |
| 2017/0210426 A1 * | 7/2017 | Gao | B62D 29/008 |
| 2018/0057060 A1 | 3/2018 | Tyan et al. | |

FOREIGN PATENT DOCUMENTS

| | | | |
|---|---|---|---|
| JP | 2007229699 A * | 9/2007 | |
| JP | 2017001553 A | 1/2017 | |
| JP | 2018070084 A | 5/2018 | |
| WO | 199710098 | 3/1997 | |
| WO | 2016084020 A1 | 6/2016 | |

OTHER PUBLICATIONS

International Search Report; International Application No. PCT/US2020/036319; International Filing Date—Jun. 5, 2020; dated Sep. 10, 2020; 6 pages.

Written Opinion for International Application No. PCT/US2020/036319; International Filing Date—Jun. 5, 2020; dated Sep. 10, 2020; 9 pages.

* cited by examiner

STRUCTURAL BODIES FOR VEHICLES HAVING HONEYCOMB INSERTS AND METHODS OF MAKING AND USING SAME

CROSS REFERENCE TO RELATED APPLICATIONS

This application is a National Stage application of PCT/US2020/036319, filed on Jun. 5, 2020. This application claims priority to EP Application No. 19178988.2, filed Jun. 7, 2019, the entire contents of which are incorporated herein by reference.

BACKGROUND

The present disclosure generally relates to energy absorbing devices for vehicle bodies, and more particularly to energy absorbing devices having bending stiffness that varies along either or both the depth and longitudinal length of the energy absorbing device.

Automotive manufactures are continuing to reduce the weight of passenger vehicles to meeting governmental regulations relating to fuel efficiency and emissions. Since the metal structure of the vehicle structure, e.g., the "body-in white", typically forms a significant portion of the total weight of a vehicle, reducing the amount of steel employed in the vehicle structure can improve the fuel efficiency and emissions of the vehicle. However, reducing vehicle structure weight by substituting lighter materials, such as aluminum and plastics, for steel generally entails a trade-off with body stiffness, which is a key characteristic that influences vehicle dynamics, durability, and crashworthiness. Vehicle designers are therefore typically limited in the extent to which lightweight materials may be employed for weight in structures that contribute to stiffness of the vehicle structure. This generates a need for vehicle structures having reduced weight that do not adversely affect the dynamics, durability, and/or crashworthiness of the vehicle structure.

Such energy absorbing devices, structural members, and vehicle bodies have generally been acceptable for their intended purpose. However, there remains a need in the art for improved energy absorbing devices, structural members, and vehicle bodies. The present disclosure provides a solution to this need.

BRIEF DESCRIPTION

An energy absorbing device includes a honeycomb body having two or more tubes stacked transversely with one another along a longitudinal axis. The honeycomb body includes an inboard portion and an outboard portion. The inboard portion of the honeycomb body is arranged along the longitudinal axis and has an inboard portion bending stiffness. The outboard portion of the honeycomb body is arranged outboard of the longitudinal axis, is coupled to the inboard portion of the honeycomb body, and has an outboard portion bending stiffness. The outboard portion bending stiffness of the outboard portion is greater than the inboard portion bending stiffness of the inboard portion.

A structural member for a vehicle body comprising a plate member; a facia member connected to the plate member, the facia member the plate member defining therebetween a cavity; and an energy absorbing device as described above supported within the cavity. The inboard portion of the honeycomb body abuts the plate member. wherein the honeycomb further comprises an intermediate portion coupling the inboard portion of the honeycomb body with the outboard portion of the honeycomb body, wherein the intermediate portion has an intermediate portion bending stiffness, the intermediate portion bending stiffness less than the outboard portion bending stiffness of the honeycomb body.

A vehicle body comprising a structural member selected from a group including a pillar, a floor rocker, a roof rail, a rail extension, and a bumper beam, the structural member comprising a plate member; a facia member connected to the plate member, the facia member the plate member defining therebetween a cavity; and an energy absorbing device as described above supported within the cavity, the inboard portion of the honeycomb body abutting the plate member. The honeycomb body further comprises a first segment with a first segment bending stiffness, a second segment connected to the first segment and axially offset therefrom along the longitudinal axis, the second segment having a second segment stiffness that is greater than first segment bending stiffness; and a support member abutting the plate member at location adjacent to the first segment of the energy absorbing device, wherein no support member abuts the plate member at a location adjacent to the second segment of the energy absorbing device.

The above described and other features are exemplified by the following figures and detailed description.

BRIEF DESCRIPTION OF THE DRAWINGS

The following figures are exemplary implementations wherein the like elements are numbered alike.

DETAILED DESCRIPTION

Figure 1A:
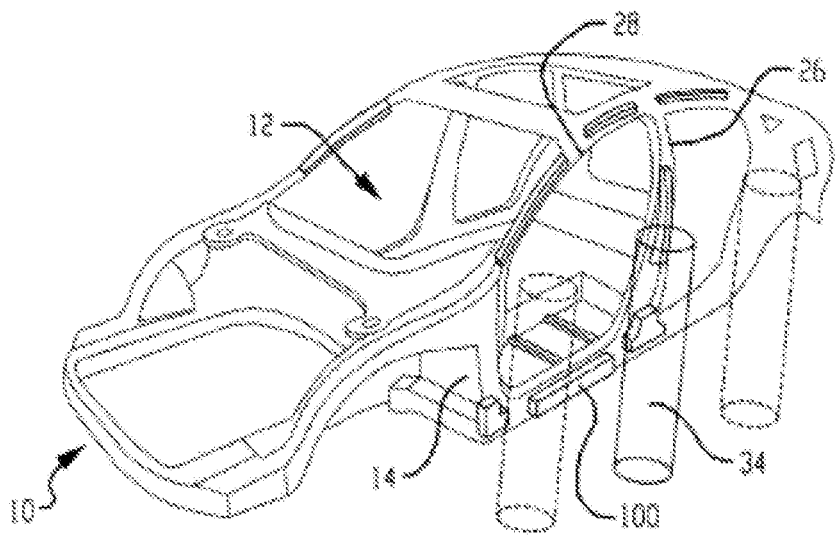
FIGS. 1A-C are full perspective, partial perspective, and partial sectional views of an energy absorbing device constructed in accordance with the present disclosure, showing a vehicle body having structural members with the energy absorbing member supported within the structural member, respectively.

During side impact the structural members forming the vehicle body, e.g., floor rockers, pillars, roof rails, and crossbars, typically absorb the majority energy associated with the impact. As mentioned above, it is desirable to reduce the weight of a vehicle without compromising the strength, durability, and/or crashworthiness of the vehicle body. Therefore, it is desirable to reduce the amount of metal forming the vehicle body while not sacrificing strength. Employed throughout the vehicle are structural members, e.g., roof rails, pillars, rockers, rail extensions, and/or crossbars, which are typically hollow and are formed from sheet metal. The thickness and shape of the sheet metal forming these hollow structures members is typically selected to provide strength sufficient for durability and crashworthiness of the vehicle. It has been discovered that the thickness of the sheet forming such structural members can be reduced, thereby reducing the weight of the structural member and hence the vehicle body formed by the structural member(s), while retaining the strength of the structural member by incorporating an energy absorbing device within the structural member.

In implementations described herein, structural members have supported therein energy absorbing devices members having polymeric bodies arranged for controlled crushing. The controlled crushing is provided by varying the bending stiffness within the depth of the energy absorbing device, e.g., in a direction orthogonal relative to the longitudinal axis of the energy absorbing device. More specifically, the energy absorbing devices are arranged such that the inboard portion of the honeycomb body included in the energy absorbing device crushes prior to the outboard portion of the honeycomb body. This causes the section force exerted by the honeycomb body to peak closer to the start of the impact than the end of the impact, and in certain implementations, prior to the loss of stiffness in the honeycomb member in response to an impact. This limits the acceleration imparted upon vehicle occupants and/or vehicle components carried within the interior of the vehicle body, limiting damage. In the case of electric and/or hybrid-electric vehicles carrying batteries below the vehicle floor, such energy absorbing devices can limit the tendency of the object responsible for the impact from intruding into the battery compartment, reducing (or eliminating entirely) the likelihood of damage to the battery as a consequence of the impact. As such, the overall weight of a vehicle can be reduced without reduction of strength or otherwise potentially limit the crashworthiness of the vehicle body.

In certain implementations energy absorbing devices described herein can have bending stiffness that varies along the longitudinal length of the energy absorbing member. For example, the energy absorbing device can have relatively low bending stiffness at locations where the energy absorbing member receives directly receives support from a crossbar or other structural member, and the energy absorbing member can have relatively high bending stiffness at longitudinal locations where the energy absorbing member is indirectly supported by the crossbar or other structural member. Such stiffness control allows the energy absorbing member to have be lightweight in comparison to energy absorbing members having uniform bending stiffness along the longitudinal length of the energy absorbing member. As such, the overall weight of a vehicle can be further reduced without reduction of strength or otherwise potentially limit the crashworthiness of the vehicle body.

The energy absorbing device includes a honeycomb body with a plurality if tubes stacked transversely with one another along a longitudinal axis. The honeycomb body includes an inboard portion and an outboard portion. The inboard axis is arranged along the longitudinal axis and has an inboard portion bending stiffness. The outboard portion is outboard of the inboard portion along the longitudinal axis, the outboard portion coupled to the inboard portion and having an outboard portion bending stiffness. The outboard portion bending stiffness is greater than the inboard portion bending stiffness.

The honeycomb body can include a plurality of transversely stacked tubes having a single cross-sectional shape. The cross-sectional shape can be selected from a group includes triangles, squares, hexagons, and circles. A depth defined by the plurality of tubes can be substantially uniform along a longitudinal span of the honeycomb body. It is also contemplated that a depth of the plurality of tubes defined by the cross-sectional shape can vary along the longitudinal span of the honeycomb body. Further, in accordance with certain implementations, the plurality of tubes of the honeycomb body can have two or more cross-sectional shapes. The cross-sectional shapes can be selected from the group including triangles, squares, hexagons, and circles. Depths of the two or more cross-sectional shapes can be uniform along the longitudinal span of the honeycomb body. Depths of the two or more cross-sectional shapes can vary along the longitudinal span of the honeycomb body.

The plurality of the tubes of the honeycomb body can have a y-rib or a vertical rib within an interior of the respective tube. In certain implementations the y-rib or the vertical rib can span the depth of the respective tube. In accordance with certain implementations the y-rib or the vertical rib can span one a portion of the depth of the respective tube. The depth the y-rib or the vertical rib extends within the plurality of tubes can be uniform along the longitudinal span of the honeycomb body. The depth the y-rib or the vertical rib extends within the plurality of tubes can vary along the longitudinal span of the honeycomb body.

The honeycomb body can have an intermediate portion coupling the inner portion of the honeycomb body to the outer portion of the honeycomb body. The intermediate portion can have an intermediate portion crush resistance, the intermediate portion crush resistance can be greater than the inner portion crush resistance, and the intermediate portion crush resistance can be smaller than the outer portion crush resistance. In certain implementations the intermediate portion crush resistance can be smaller than the inner portion crush resistance and the intermediate portion crush resistance can be greater than the outer portion crush resistance. In accordance with certain implementations the intermediate portion crush resistance can be constant along the longitudinal span of the honeycomb body. It is also contemplated that the intermediate portion crush resistance can vary varies along the longitudinal span of the honeycomb body.

The plurality of tubes forming one of the inner portion, the outer portion, and the intermediate portion of the honeycomb body can have a cross-sectional shape that is different from a cross-sectional shape of another of the inner portion, the outer portion, and the intermediate portion of the honeycomb body. For example, the plurality of tubes forming the inner portion of the honeycomb body can have a hexagonal cross-sectional shape, the plurality of tubes forming the intermediate portion of the honeycomb body have a hexagonal cross-sectional shape with a y-rib extending along a depth of the intermediate portion, and the plurality of tubes forming the outer portion of the honeycomb body can have a circular cross-sectional shape. In certain implementations the honeycomb body can be formed using an injection molding technique. In accordance with certain implementations the honeycomb body can be formed using an additive manufacturing technique.

A more complete understanding of the components, processes, and apparatuses disclosed herein can be obtained by reference to the accompanying drawings. These FIGS. (also referred to herein as "FIG.") are merely schematic representations based on convenience and the ease of demonstrating the present disclosure, and are, therefore, not intended to indicate relative size and dimensions of the devices or components thereof and/or to define or limit the scope of the exemplary implementations. Although specific terms are used in the following description for the sake of clarity, these terms are intended to refer only to the particular structure of the implementations selected for illustration in the drawings, and are not intended to define or limit the scope of the disclosure. In the drawings and the following description below, it is to be understood that like numeric designations refer to components of like function.

Referring to FIG. 1A, a vehicle body 10 is shown. The vehicle body 10 defines an interior 12 and includes a plurality of structural members 14 one or more of which includes an energy absorbing device 100. The plurality of structural members 14 are arranged about the interior 12 of the vehicle body 10 and the interior 12 of the vehicle body 10 is configured to carry vehicle occupants and various vehicle components. Among the vehicle components are a battery 16 (shown in FIG. 1C), which is carried within the vehicle body 10 in a battery compartment 18 (shown in FIG. 1C) located below the vehicle passenger compartment. In certain implementations the vehicle body 10 is a vehicle body for an electric or a hybrid-electric vehicle. However, as will be appreciated by those of skill in the art in view of the present disclosure, other types of vehicles can also benefit from the present disclosure, such as vehicles carrying internal combustion engines by way of non-limiting example.

Figure 1B:
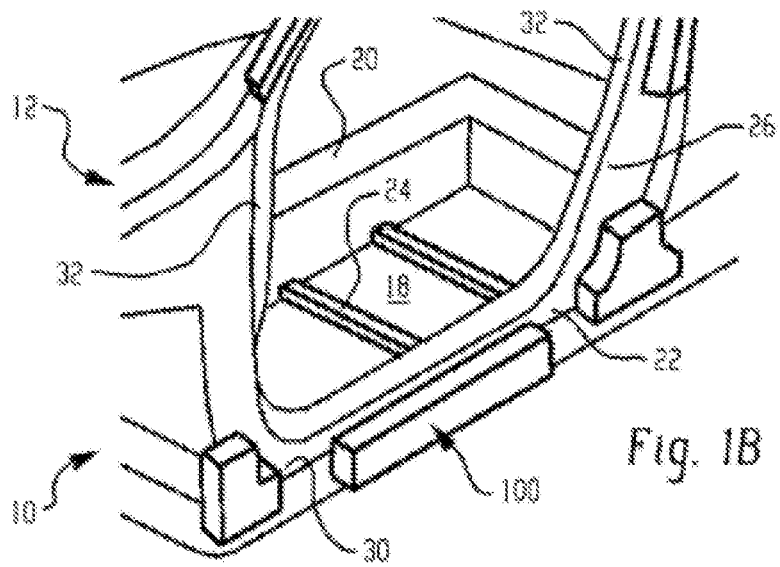

With reference to FIG. 1B, the plurality of structural members 14 (shown in FIG. 1A) include a tunnel member 20, a floor rocker 22, and a crossbar 24. The plurality of structural members 14 also includes a pillar 26, a roof rail 28 (shown in FIG. 1A), and a rail extension 30. The tunnel member 20 extends longitudinally along a length of the vehicle body 10 and along the centerline of the vehicle body 10. The floor rocker 22 extends longitudinally along the vehicle body 10 and is substantially parallel to the tunnel member 20. The crossbar 24 extends laterally across the vehicle body 10 and between the tunnel member 20 and the floor rocker 22, the floor rocker 22 thereby supported by the crossbar 24 at longitudinal locations where the crossbar 24 abuts the floor rocker 22. The rail extension 30 couples the floor rocker 22 to the pillar 26, and the pillar 26 extends upwards from the rail extension 30 to couple the roof rail 28 with the floor rocker 22. So connected the floor rocker 22, the pillar 26 and the roof rail 28 extend about a door ring 32 disposed on a side of the vehicle body 10. So disposed the floor rocker 22 is positioned to oppose side impacts to the vehicle body 10 and in this respect is configured with strength sufficient to absorb energy and resist intrusion into the interior 12 of the vehicle body 10 during side impact events, such as a side pole impact 34 (shown in FIG. 1A).

Figure 1C:
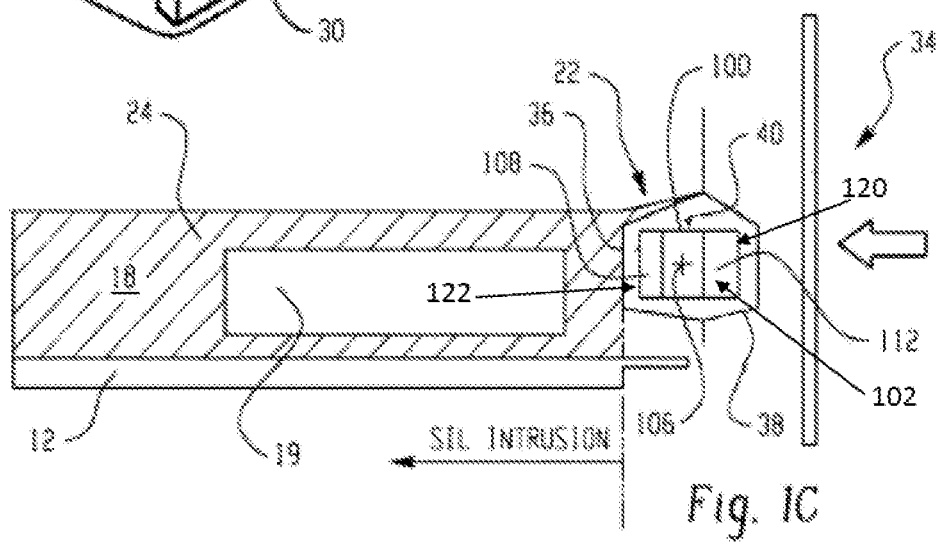

With reference to FIG. 1C, portions of the vehicle body 10 and the floor rocker 22 are shown. The floor rocker 22 is arranged laterally outboard of the tunnel member 20 (shown in FIG. 1B) and includes a plate member 36 and a facia member 38. The crossbar 24 extends between the plate member 36 and the tunnel member 20 and is laterally supported thereby. The facia member 38 is connected to the plate member 36 such that the plate member 36 and the facia member 38 define between one another a cavity 40. The energy absorbing device 100 is supported within the cavity 40, e.g., with a fastener, a clip, a bracket, and/or an adhesive, along a longitudinal axis 106. Although described herein in the context of the floor rocker 22 it is to be understood and appreciated that energy absorbing device 100 can also be employed in other structural members, such as one or more of the pillar 26 (shown in FIG. 1A), the roof rail 28 (shown in FIG. 1A), or the rail extension 30 (shown in FIG. 1B), as suitable for an intended application.

The longitudinal length of the structural members 14 (shown in FIG. 1A) is dependent upon the particular area of the vehicle body 10 within which the structural member 14 is employed, while the length of the energy absorbing device 100 is dependent upon the amount and location of enhanced structural integrity in the energy absorbing member 100. The energy absorbing member 100 can have a span commensurate with the longitudinal length of the structural member 14 or less than the longitudinal length of the structural member 14 (e.g., can be localized; i.e., disposed only in a specific location to attain enhanced structural integrity of that location). Desirably, to maximize the weight reduction, the energy absorbing member 100 is localized so as to add the minimum amount of weight needed to attain a desired structural integrity (e.g., a structural integrity that this greater than or equal to the standard metal component without the thinner walls). The energy absorbing device 100 can have a length of less than or equal to 1 meter, specifically, less than or equal to 800 millimeters, and more specifically, less than or equal to 300 millimeters. The length of the energy absorbing device 100 can be less than or equal to 80% of the length of the structural member, specifically, less than or equal to 60%, more specifically, less than or equal to 50%, and yet more specifically, 10% to 35% of the length of the structural member (i.e., the structural member reinforced by the honeycomb body), For example, the energy absorbing device 100 can have a length of 150 millimeters to 350 millimeters, specifically, 200 millimeters to 250 millimeters, such as for use in a pillar or rail. In other implementations, the energy absorbing device 100 has a length of between about 500 millimeters and about 800 millimeters, specifically, 600 millimeters to 700 millimeters, such as for use in a floor rocker. The structural member 14 is a hollow metal element.

Some possible structural member material(s) include aluminum, titanium, chrome, magnesium, zinc, and steel, plastic (e.g., fiber reinforced plastic) as well as combinations comprising at least one of the foregoing materials. The thickness of the walls of the structural members 14 can all be the same or can be different to enhance stiffness in a desired direction. For example, one set of opposing walls can have a greater/lesser thickness than the other set of opposing walls. In some implementations, the structural members 14 have a wall thickness of less than or equal to 10 millimeters, specifically, 1.2 millimeters to 5 millimeters, and more specifically 1.8 millimeters to 4 millimeters. Generally, metal walls (e.g., floor rocker, rails, pillars, bumper beam, and so forth), have a wall thickness of greater than 1.8 millimeters. Therefore, the use of the energy absorbing device 100 enables reduction in wall thickness (of the structural component) of greater than or equal to 10%, specifically, greater than or equal to 20%, and even greater than or equal to 25%.

Figure 2A:
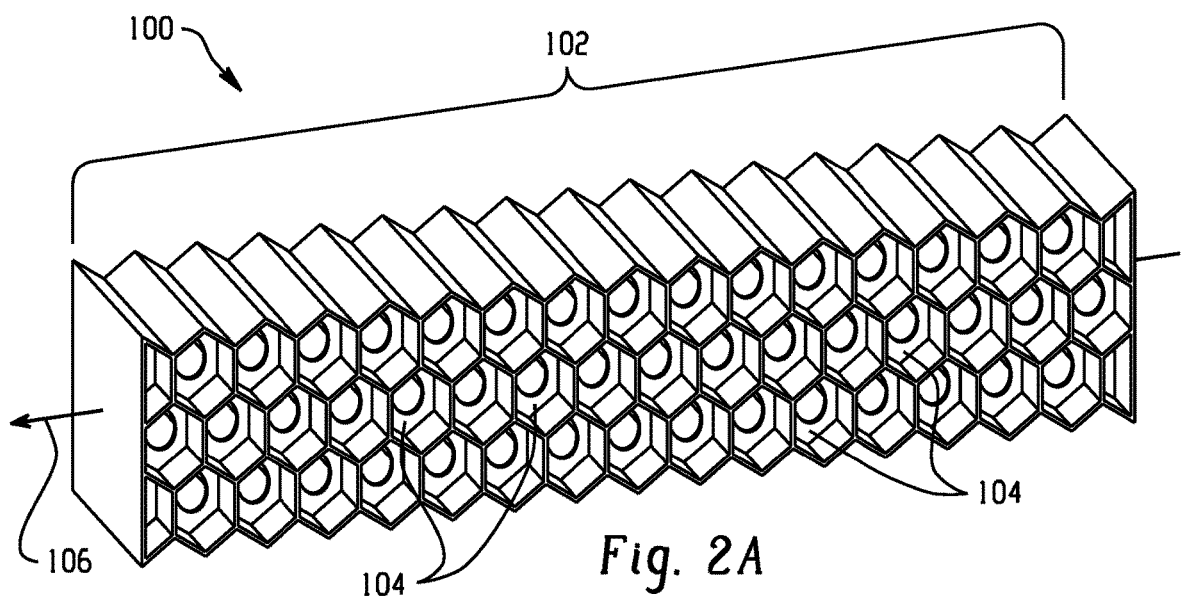
FIGS. 2A-2D are perspective, plan, and partial sectional views of the energy absorbing device of FIG. 1A according to an implementation, showing inboard and outboard portions of a honeycomb body having a plurality of tubes defining hexagonal shapes, respectively.
Figure 2B:
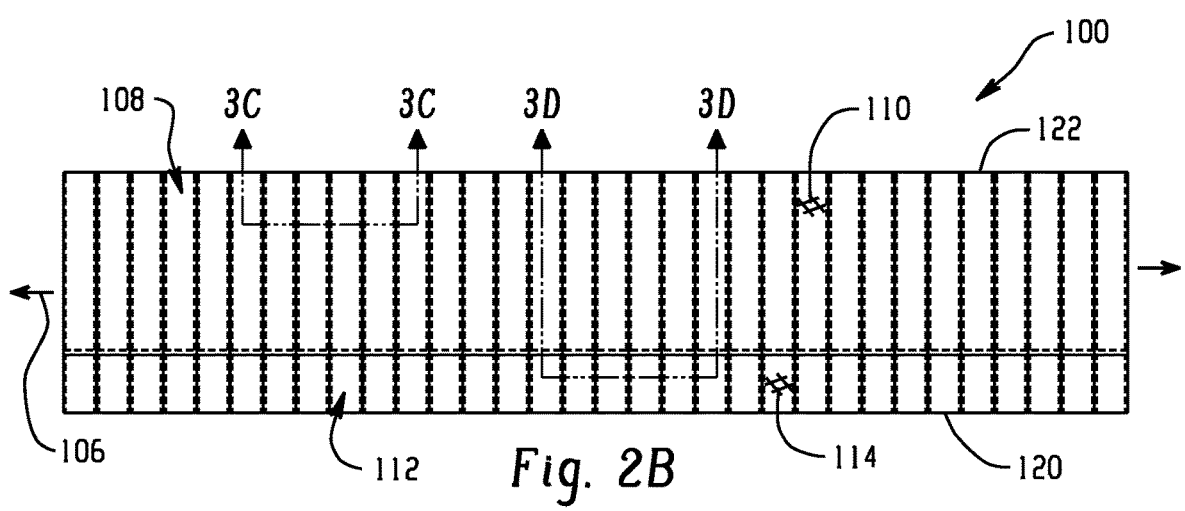

With reference to FIGS. 2A-2D, the energy absorbing device 100 is shown. As shown in FIGS. 2A and 2B, the energy absorbing device 100 generally includes a honeycomb body 102 having a plurality of tubes 104 stacked transversely with one another along the longitudinal axis 106. The honeycomb body 102 has an inboard portion 108 (shown in FIG. 2B) with an inboard portion bending stiffness 110 (shown in FIG. 2B) and an outboard portion 112 (shown in FIG. 2B) with an outboard portion bending stiffness 114 (shown in FIG. 2B). The outboard portion 112 is arranged outboard of the longitudinal axis 106. The inboard portion 108 is arranged inboard of the outboard portion 112, is coupled to the outboard portion 112, and in the illustrated implementation spans the longitudinal axis 106. The outboard portion bending stiffness 114 of the outboard portion 112 is greater than the inboard portion bending stiffness 110 of the inboard portion 108.

The plurality of tubes 104 extend laterally between an outboard face 120 and an inboard face 122 of the energy absorbing device 100. More specifically, the plurality of tubes 104 span the honeycomb body 102 between the outboard face 120 of the honeycomb body 102 and the inboard face 122 of the honeycomb body 102. The inboard face 122 of the honeycomb body 102 opposes the plate member 36 (shown in FIG. 1C) and the outboard face 120 of the honeycomb body 102 opposes the facia member 38 (shown in FIG. 1C). It is contemplated that inboard face 122 of the honeycomb body 102 further abut the plate member 36, e.g., be in intimate mechanical contact therewith, for communication for force associated with the side pole impact 34 (shown in FIG. 1A) for energy absorption during the side pole impact 34 via crushing of the plurality of tubes 104 between the object impact and the plate member 36.

Figure 2C:
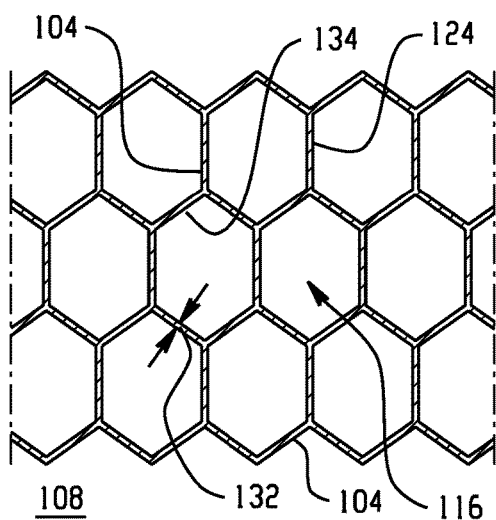
Figure 2D:
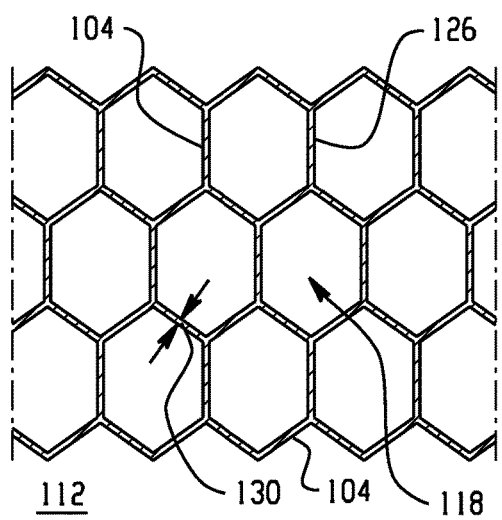

As shown in FIGS. 2C and 2D, the inboard profile 116 defined by the plurality of tubes 104 has a hexagonal shape 124 and the outboard profile 118 defined by the plurality of tubes has a hexagonal shape 126. It is contemplated that wall thickness 130 of the honeycomb body 102 within the outboard portion 112 be greater than wall thickness 132 in the inboard portion 108 (shown in FIG. 2B), the wall thickness 130 imparting the outboard portion 112 with the outboard portion bending stiffness 114 (shown in FIG. 2B) greater than the inboard portion bending stiffness 110. Such wall thickness variation can be accomplished, for example, by forming the energy absorbing device 100 from a polymeric material 134 using an injection molding technique.

The polymeric material 134 can include any thermoplastic material or combination of thermoplastic materials that can be formed into the desired shape and provide the desired properties, and may be filled or unfilled. Examples of suitable polymeric materials include thermoplastic materials as well as combinations of thermoplastic materials with metal, elastomeric material, and/or thermoset materials. Possible thermoplastic materials include polybutylene terephthalate (PBT); acrylonitrile-butadiene-styrene (ABS); polycarbonate; polycarbonate/PBT blends; polycarbonate/ABS blends; copolycarbonate-polyesters; acrylic-styrene-acrylonitrile (ASA); acrylonitrile-(ethylene-polypropylene diamine modified)-styrene (AES); phenylene ether resins; blends of polyphenylene ether/polyamide; polyamides; phenylene sulfide resins; polyvinyl chloride PVC; high impact polystyrene (HIPS); low/high density polyethylene (L/HDPE); polypropylene (PP); expanded polypropylene (EPP); and thermoplastic olefins (TPO). For example, the plastic material can include a Noryl GTX® thermoplastic resin or a Xenoy® synthetic resin, each available from SABIC Global Technologies of Bergen op Zoom, Netherlands. The polymeric material 134 can also include combinations comprising one or more of the above-described polymeric materials.

Figure 3A:
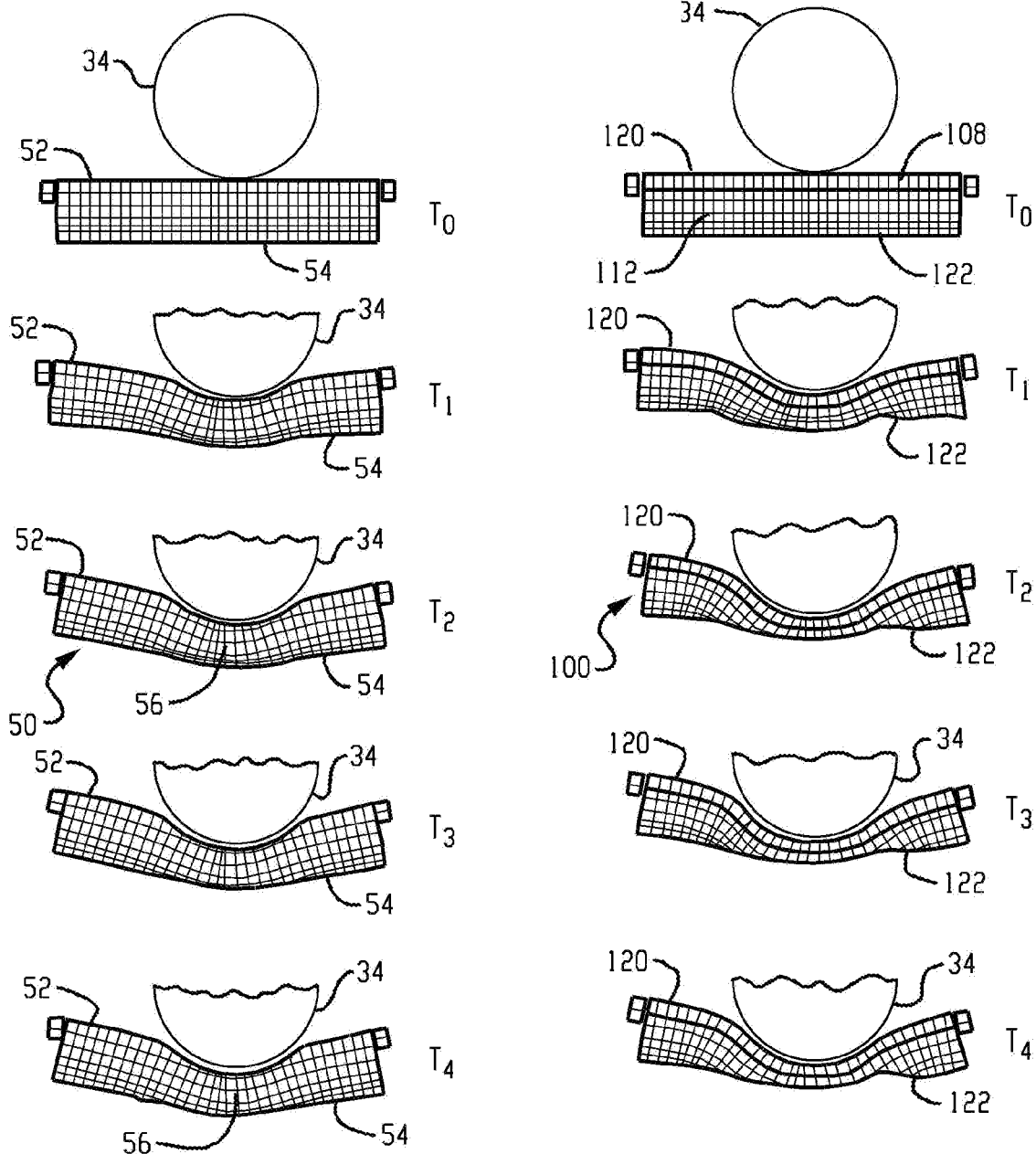
FIGS. 3A and 3B are time sequence diagrams and a chart of the energy absorbing device of FIG. 1A undergoing a side pole impact, showing the energy absorbing device progressively crushing from an inboard face to an outboard face and exerting a section force than peaks early in the impact, respectively.
Figure 3B:
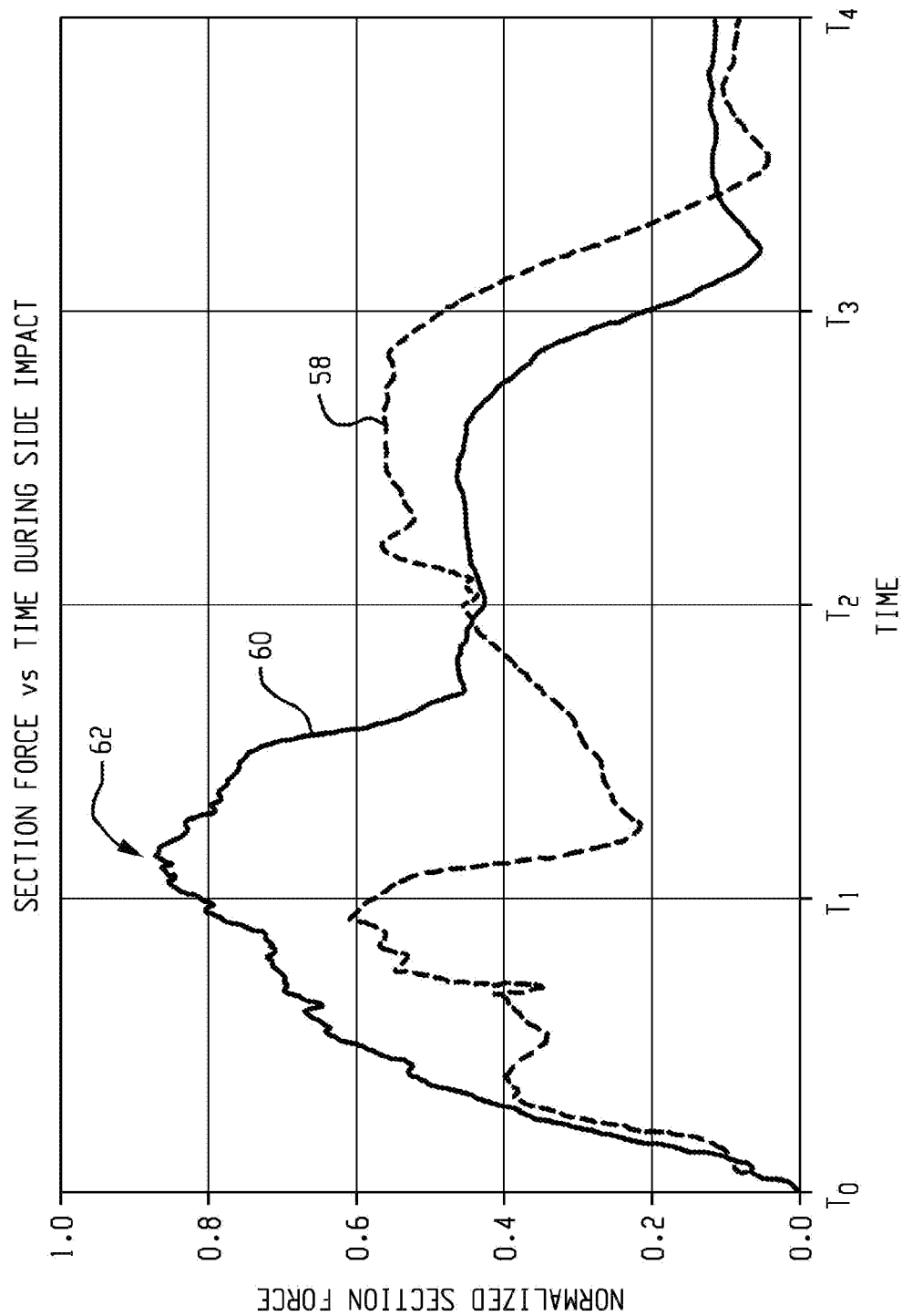

With reference to FIGS. 3A and 3B, crushing sequences and section force vs time plots are shown for the energy absorbing device 100 and an energy absorbing device 50 having uniform bending stiffness through its depth. As shown on the left-hand side of FIG. 3A (relative to the top of the drawing figure), tubes forming the energy absorbing device 50 crush from both an outboard surface 52 and an inboard surface 54 towards the center of the energy absorbing device 50. This causes the section force exerted by the energy absorbing device 50 to be relatively consistent between times $T_2$ and $T_4$ as the tubes forming the energy absorbing device 50 crush from both inboard face 52 and the outboard face 54 toward the center 56 of the energy absorbing device 50, as shown in FIG. 3B with the section force trace 58.

In contrast, as shown on the right-hand side of FIG. 3A (relative to the top of the drawing figure), the energy absorbing device 100 crushes from the inboard face 122 toward the outboard face 120 of the energy absorbing device 100. This causes the energy absorbing device 100 to exert section force responsive to the side pole impact 34 where section force peaks shortly after the beginning of the impact event, as shown in FIG. 3B with a trace 60. In the illustrated implementation the peak section force 62 occurs about midway between the time $T_1$ and time $T_2$, the section force trace 60 declining as the inboard portion 108 and the outboard portion 112 thereafter crush. As a consequence the acceleration imparted to the vehicle occupants and/or vehicle components carried within the interior 12 (shown in FIG. 1A) of the vehicle body 10 (shown in FIG. 1A) is relatively low in comparison with that associated with the impact to the energy absorbing device 50. In vehicles carrying batteries, e.g., the battery 16 (shown in FIG. 1C), this reduces the likelihood of the battery fracturing. It also limits the distance the impacting object intrudes into the interior 12 of the vehicle body 10, as shown in FIG. 3A by the comparative amounts of deflection shown at time $T_4$ on both the left-hand and right-hand sides of the figure.

Figure 4A:
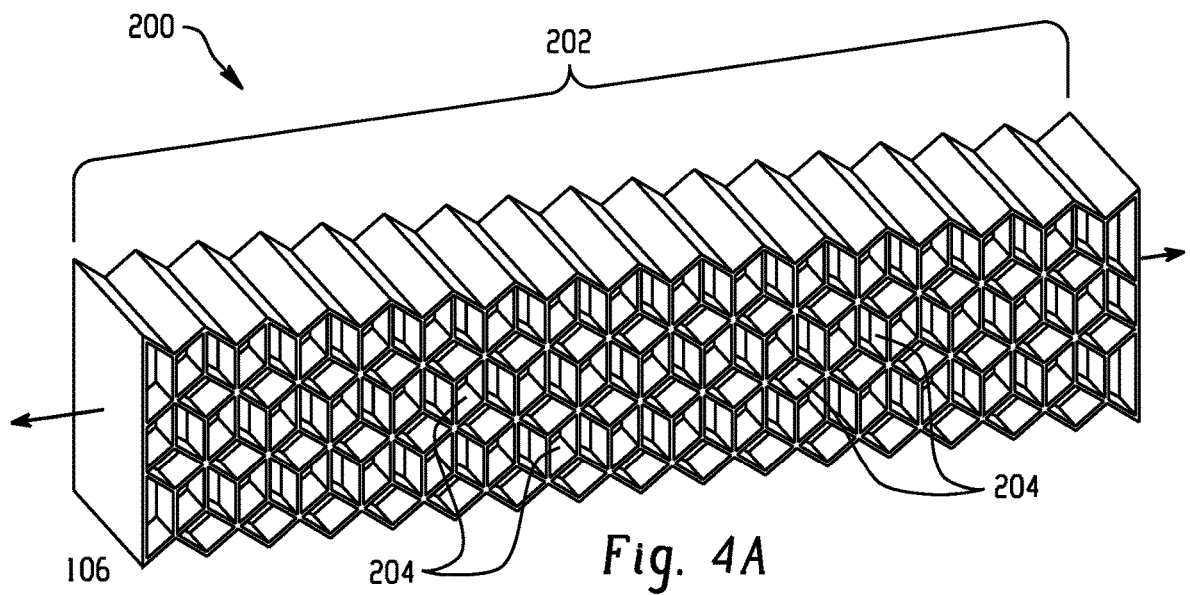
FIGS. 4A-4D are perspective, plan, and partial sectional views of the energy absorbing device of FIG. 1A according to another implementation, showing an energy absorbing device having an outboard portion with a rib, respectively.

With reference to FIGS. 4A-4D, an energy absorbing device 200 is shown. The energy absorbing device 200 is similar to the energy absorbing device 100 (shown in FIG. 1A), and additionally includes an outboard profile 218 having a hexagonal shape 226 with a rib 250 arranged within the hexagonal shape 226 and an inboard profile 216 having a hexagonal shape 224 with no rib arranged within the hexagonal shape 224. As shown in FIG. 4A, the energy absorbing device 200 includes a honeycomb body 202. The honeycomb body 202 has a plurality of tubes 204 stacked transversely with one another along the longitudinal axis 106.

Figure 4B:
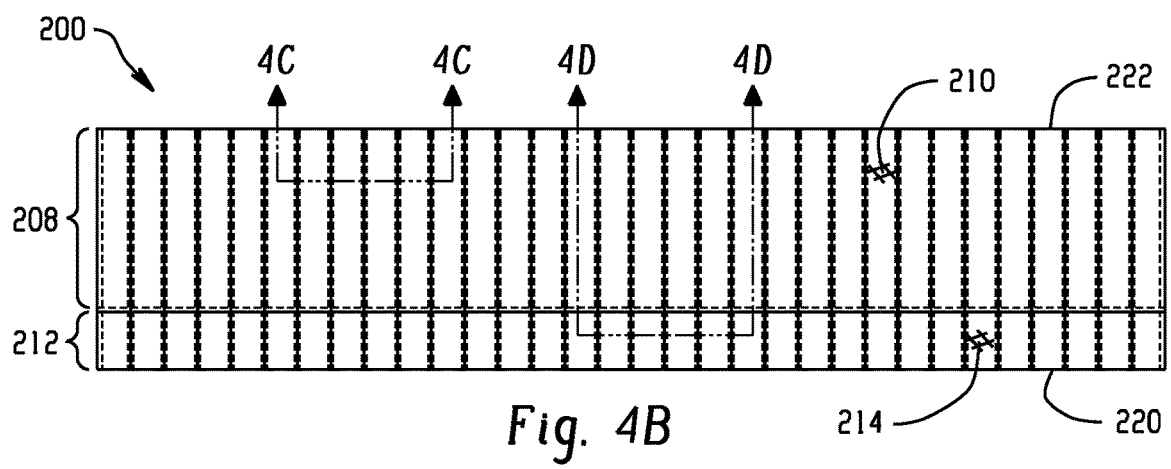

As shown in FIG. 4B, the outboard portion 212 is arranged outboard of the longitudinal axis 106, is coupled to the inboard portion 208 of the honeycomb body 202, and has an outboard bending portion stiffness 214. In the illustrated implementation the inboard portion 208 laterally spans the longitudinal axis 106.

The plurality of tubes 204 (shown in FIG. 4A) extend laterally between an outboard face 220 and an inboard face 222 of the energy absorbing device 200. More specifically, the plurality of tubes 204 span the honeycomb body 202 (shown in FIG. 4A) between the outboard face 220 of the honeycomb body 202 and the inboard face 222 of the honeycomb body 202. It is contemplated that, when supported within the structural member 14 (shown in FIG. 1A), e.g., the floor rocker 22 (shown in FIG. 1C), the inboard face 222 of the honeycomb body 202 opposes the plate member 36 (shown in FIG. 1C) and the outboard face 220 of the honeycomb body 202 opposes the facia member 38 (shown in FIG. 1C). It is contemplated that inboard face 222 of the honeycomb body 202 abut the plate member 36 (shown in FIG. 1C) such that, responsive to the side pole impact 34 (shown in FIG. 1A), the plurality of tubes 204 crush between the object responsible for the impact and the plate member 36 to absorb energy associated with the impact and limit acceleration imparted to vehicle occupants and vehicle components carried within the interior 12 (shown in FIG. 1A) of the vehicle body 10 (shown in FIG. 1A).

Figure 4C:
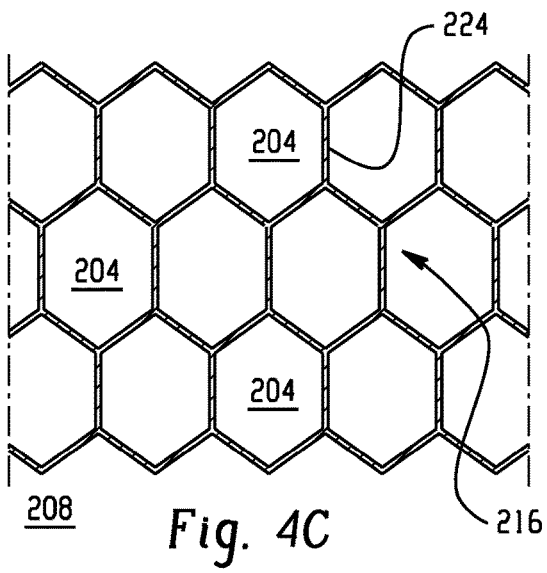
Figure 4D:
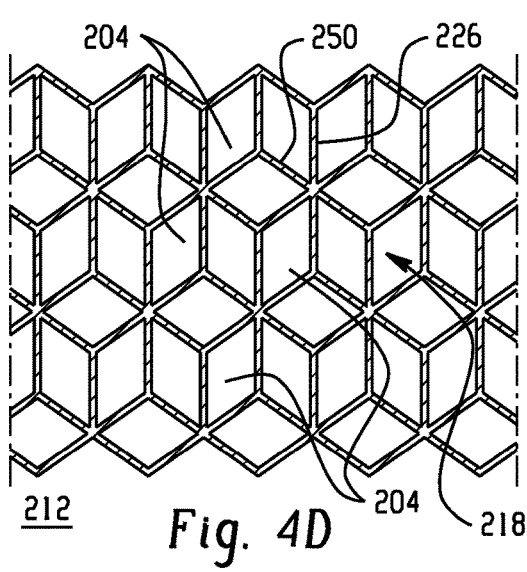

As shown in FIGS. 4C and 4D, the inboard profile 216 defined by the plurality of tubes 204 has a hexagonal shape 224. The outboard profile 218 defined by the plurality of tubes 204 also has a hexagonal shape 226, the profile defined by each of the plurality of tubes 204 being continuous between the inboard face 222 and the outboard face 220 in this respect. The plurality of tubes 204 in the inboard portion 208 have no rib arranged within the respective tubes of the plurality of tubes 204. The plurality of tubes 204 in the outboard portion 212 have ribs 250 arranged therein, the ribs 250 render the outboard portion bending stiffness 214 (shown in FIG. 4B) of the outboard portion 212 greater than the inboard portion bending stiffness 210 (shown in FIG. 4B) of the inboard portion 208 of the honeycomb body 202. As will be appreciated by those of skill in the art in view of the present disclosure, the greater stiffness of the outboard portion 112 causes the energy absorbing device 200 to crush from the inboard face 222 to the outboard face 220. The greater stiffness of the outboard portion 112 also causes the energy absorbing device 200 to exert section force similar (or equivalent) to that of the energy absorbing device 100 insofar as the peak section force being generated closer to the onset of an impact, as shown in FIGS. 3A and 3B. In the illustrated implementation the rib 250 is a y-rib. It is contemplated that other types of ribs can be employed, such as horizontal or vertical ribs, as suitable for an intended application.

Figure 5A:
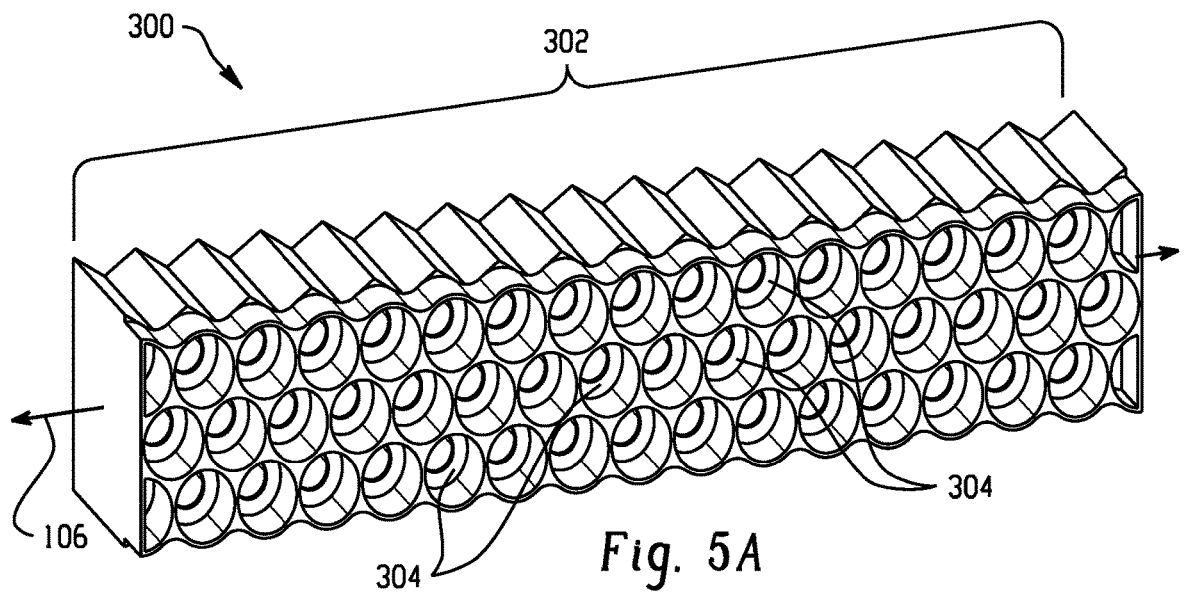
FIGS. 5A-5D are perspective, plan, and partial sectional views of the energy absorbing device of FIG. 1A according to a further implementation, showing an energy absorbing device having an outboard portion having tubes that define circular shapes, respectively.

With reference to FIGS. 5A-5D, an energy absorbing device 300 is shown. The energy absorbing device. 300 is similar to the energy absorbing device 100 (shown in FIG. 1A), and additionally includes an outboard profile 318 that is different than an inboard profile 316 of the energy absorbing device 300. In this respect the outboard profile 318 has a circular shape 326 and the inboard profile 316 has a hexagonal shape 324 (shown in FIG. 5C). As shown in FIG. 5A, the energy absorbing device 300 includes a honeycomb body 302 having a plurality of tubes 304 stacked transversely with one another along the longitudinal axis 106.

Figure 5B:
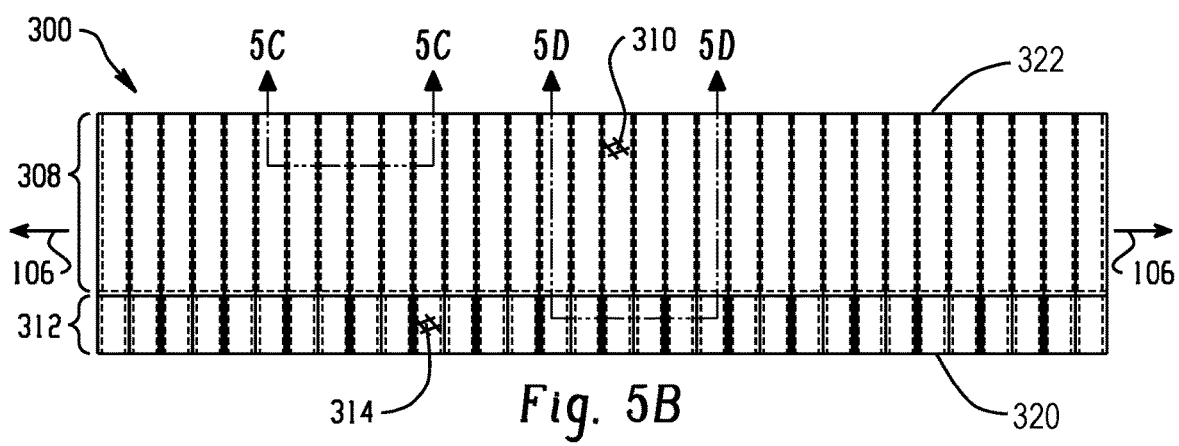

As shown in FIG. 5B, the honeycomb body 102 (shown in FIG. 5A) has an inboard portion 308 and an outboard portion 312. The outboard portion 312 is arranged outboard of the longitudinal axis 106 and is coupled to the outboard portion 312. The inboard portion 308 has an inboard portion bending stiffness 310, the outboard portion 312 has an outboard portion bending stiffness 314, and the outboard portion bending stiffness 314 of the outboard portion 312 is greater than the inboard portion bending stiffness 310 of the inboard portion 308. In this respect the circular shape 326 (shown in FIG. 5D) of the plurality of tubes 304 in the outboard portion 312 impart to the outboard portion 312 greater beading stiffness than the hexagonal shape 324 (shown in FIG. 5C) defined in the inboard portion 308.

The plurality of tubes 304 extend laterally between an outboard face 320 and an inboard face 322 of the energy absorbing device 300. More specifically, the plurality of tubes 304 span the honeycomb body 302 between the outboard face 320 of the honeycomb body 302 and the inboard face 322 of the honeycomb body 302. The inboard face 322 of the honeycomb body 302 oppose the plate member 36 (shown in FIG. 1C) and the outboard face 320 of the honeycomb body 302 oppose the facia member 38 (shown in FIG. 1C). It is also contemplated that inboard face 322 of the honeycomb body 302 abut the plate member 36 (shown in FIG. 1C) such that, responsive to the side pole impact 34 (shown in FIG. 1A), the plurality of tubes 304 crush between the object exerting the impact force and the plate member 36.

Figure 5C:
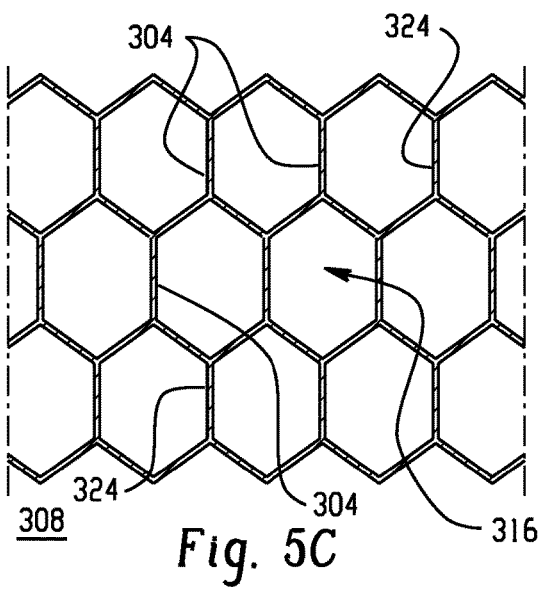
Figure 5D:
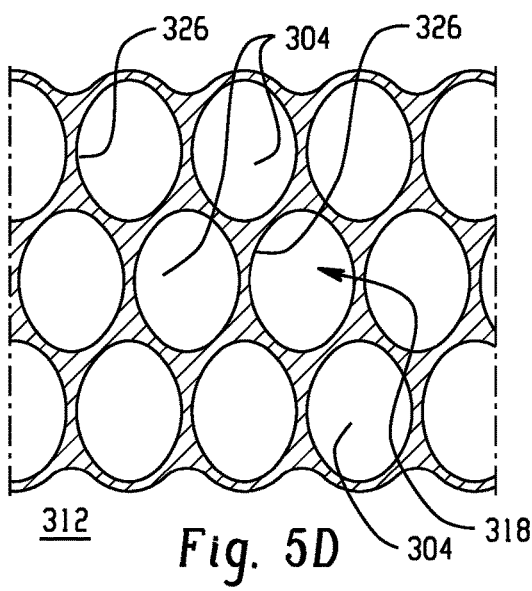

As shown in FIGS. 5C and 5D, the inboard profile 316 defined by the plurality of tubes 304 has the hexagonal shape 324 and the outboard profile 318 defined by each of the plurality of tubes 304 has the circular shape 326. It is contemplated that the circular shape 326 render the outboard portion bending stiffness 314 (shown in FIG. 5B) of the outboard portion 312 greater than the inboard portion bending stiffness 310 (shown in FIG. 5B) of the inboard portion 308 of the honeycomb body 302. As will be appreciated by those of skill in the art in view of the present disclosure, the shape difference in the shape defined by each of the plurality of tubes 304 in the inboard portion 308 and the outboard portion 312 causes the energy absorbing device 300 to crush and exert section force similar (or equivalent) to that of the energy absorbing device 100, as shown in FIGS. 3A and 3B. In the illustrated implementation the circular shape 326 is oblong in the vertical direction (relative to gravity). As will be appreciated by those of skill in the art in view of the present disclosure, the circular shape 326 can be symmetrical, oblong in the horizontal direction, or oblong in any orientation, as suitable for an intended application.

Figure 6A:
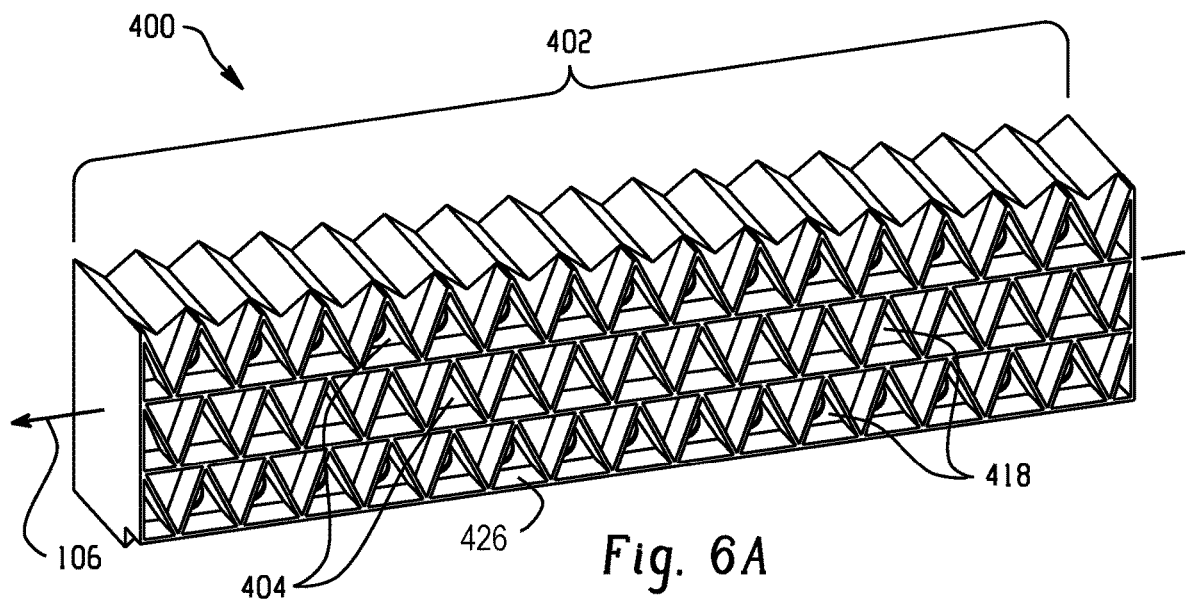
FIGS. 6A-6D are perspective, plan, and partial sectional views of the energy absorbing device of FIG. 1A according to yet another implementation, showing an energy absorbing device having an outboard portion having tubes that define triangular shapes, respectively.

With reference to FIGS. 6A-6D, an energy absorbing device 400 is shown. The energy absorbing device 400 is similar to the energy absorbing device 100 (shown in FIG. 1A), and additionally includes an outboard profile 418 having a triangular shape 426. As shown in FIG. 6A, the energy absorbing device 400 includes a honeycomb body 402 having a plurality of tubes 404 stacked transversely with one another along the longitudinal axis 106.

Figure 6B:
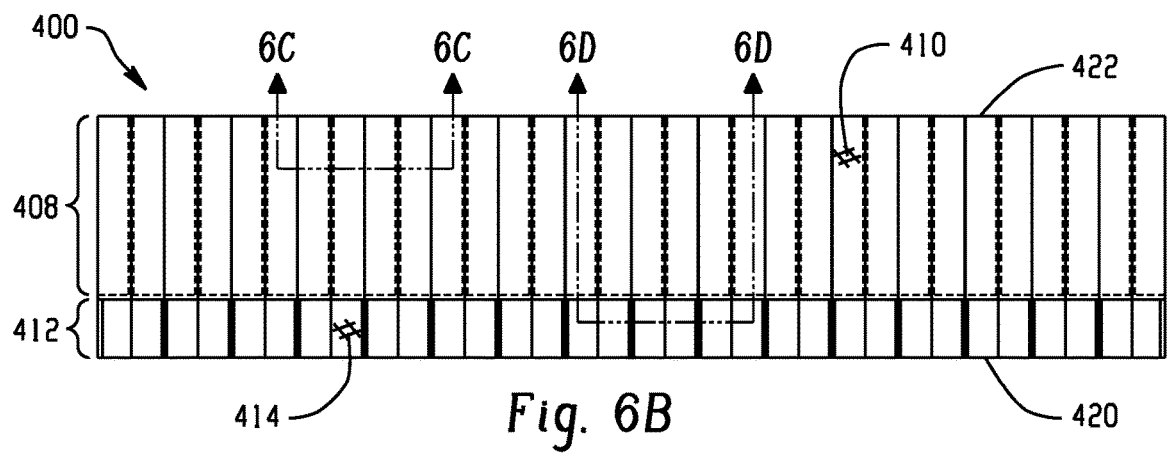

As shown in FIG. 6B, the honeycomb body 402 (shown in FIG. 6A) has an inboard portion 408 and an outboard portion 412. The inboard portion is arranged along the longitudinal axis 106 and has an inboard portion bending stiffness 410. The outboard portion 412 is arranged outboard of the longitudinal axis 106, is coupled to the inboard portion 408, and has an outboard portion bending stiffness 414. The outboard portion bending stiffness 414 is greater than the inboard bending stiffness 410. In the illustrated implementation the greater stiffness of the outboard portion 412 relative to the bending stiffness of the inboard portion 408 is imparted by the triangular shape 426 (shown in FIG. 6D) defined by the plurality of tubes 404 in the outboard portion of the energy absorbing device 400.

The plurality of tubes 404 extend laterally between an outboard face 420 and an inboard face 422 of the energy absorbing device 400. More specifically, the plurality of tubes 404 span the honeycomb body 402 between the outboard face 420 of the honeycomb body 402 and the inboard face 422 of the honeycomb body 402. It is contemplated that the inboard face 422 of the honeycomb body 402 oppose the plate member 36 (shown in FIG. 1C), and the outboard face 420 of the honeycomb body 402 additionally oppose the facia member 38 (shown in FIG. 1C). It is also contemplated that inboard face 422 of the honeycomb body 402 abut the plate member 36 (shown in FIG. 1C) such that, responsive to the side pole impact 34 (shown in FIG. 1A), the plurality of tubes 404 crush between the object exerting the impact force and the plate member 36.

Figure 6C:
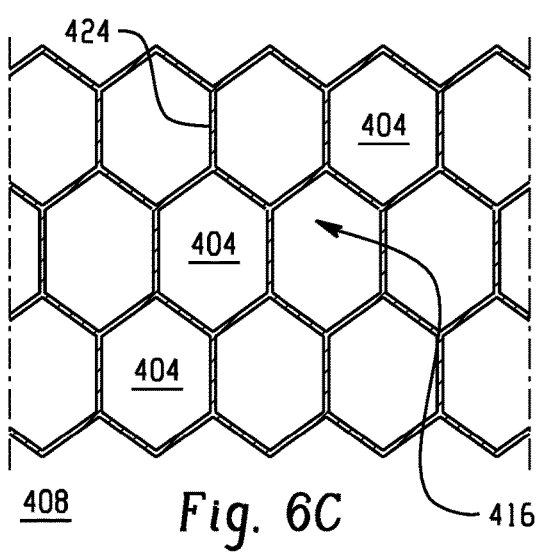
Figure 6D:
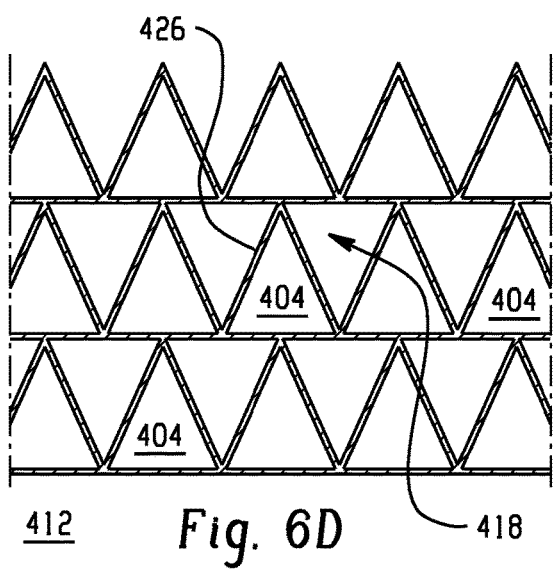

As shown in FIGS. 6C and 6D, the inboard profile 416 defined by the plurality of tubes 404 has a hexagonal shape 424 and the outboard profile 418 defined by the plurality of tubes has a triangular shape 426. The triangular shape 426 causes the outboard portion bending stiffness 414 (shown in FIG. 6B) to be greater than the inboard bending stiffness 410. As will be appreciated by those of skill in the art in view of the present disclosure, the outboard portion bending stiffness 414 causes the energy absorbing device 400 to crush and exert section force similar (or equivalent) to that of the energy absorbing device 100, as shown in FIGS. 3A and 3B, the energy absorbing device 400 exerting peak section force closer to the beginning of an impact than the end of the impact and thereby limiting accelerations to vehicle occupants and vehicle components carried by the vehicle body 10 (shown in FIG. 1A).

With reference to FIGS. 7A-7F, an energy absorbing device 500 is shown. The energy absorbing device 500 is similar to the energy absorbing device MI (shown in FIG. 1A) and additionally includes an intermediate portion 550.

In this respect the energy absorbing device 500 includes a honeycomb body 502 having a plurality of tubes 504 stacked transversely with one another along the longitudinal axis 106. The honeycomb body 502 includes an inboard portion 508 arranged along the longitudinal axis 106 and having an inboard portion bending stiffness 510, an outboard portion 512 arranged outboard of the longitudinal axis 106, and the intermediate portion 550. The outboard portion 512 has an outboard portion bending stiffness 514, which is greater than the inboard portion bending stiffness 510 and is coupled to the inboard portion 508 by the intermediate portion 550. The intermediate portion 550 has an intermediate portion bending stiffness 552 that is less than the outboard portion bending stiffness 514 of the outboard portion 512. This imparts a stepwise graduation to the bending stiffness of the honeycomb body 502 along the depth of the energy absorbing device 500.

Each of the plurality of tubes 504 of the honeycomb body 502 spans the inboard portion 508, the intermediate portion 550, and the outboard portion 512 of the honeycomb body 502. In this respect each of the plurality of tubes 504 extend between an inboard face 522 and an outboard face 520 of the energy absorbing device 500. It is contemplated that the energy absorbing device 500 can be supported within the floor rocker 22 (shown in FIG. 1B) such that ends of the plurality of tubes 504 abut the plate member 36 (shown in FIG. 1C) for crushing against the plate member 36 during a side impact, e.g., the side pole impact 34 (shown in FIG. 1A). In certain implementations the honeycomb body 502 is constructed using a polymeric material, e.g., the polymeric material 134 (shown in FIG. 2A), using an injection molding technique. In accordance with certain implementations the honeycomb body 502 is constructed using an additive manufacturing technique. Advantageously, forming the energy absorbing device 500 using an additive manufacturing techniques allows for forming the honeycomb body 502 with structures within the intermediate portion 550 that are prohibitively expensive (or mechanically not possible) using injection molding techniques, e.g., the ribs 558, allowing the intermediate portion 550 to be relative stiff without otherwise increasing depth of the intermediate portion 550.

Figure 7A:
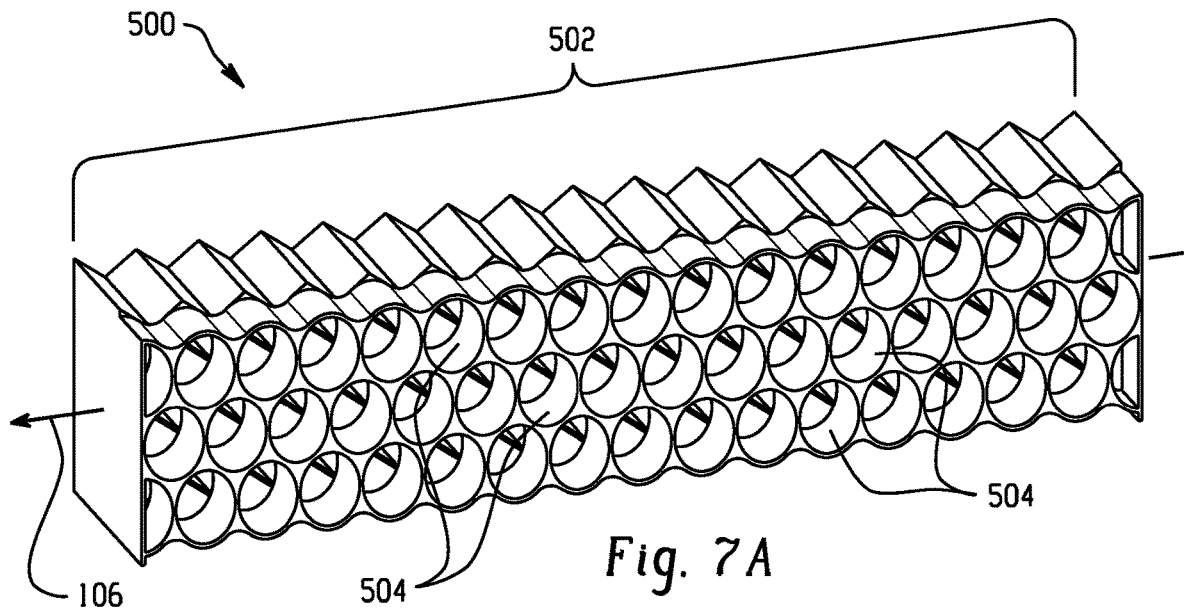
FIGS. 7A-7F are perspective, plan, and partial sectional views of the energy absorbing device of FIG. 1A, showing an implementation having an intermediate segment, wherein tubes define a shape in the intermediate segment that is different than that defined by the tubes in the inboard portion and in the outboard portion, respectively.
Figure 7B:
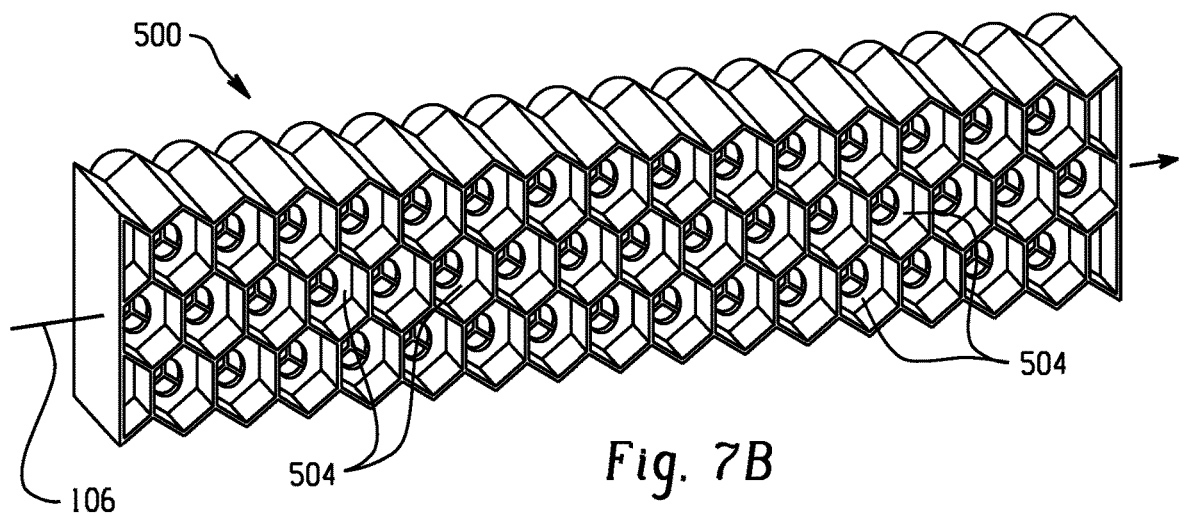
Figure 7C:
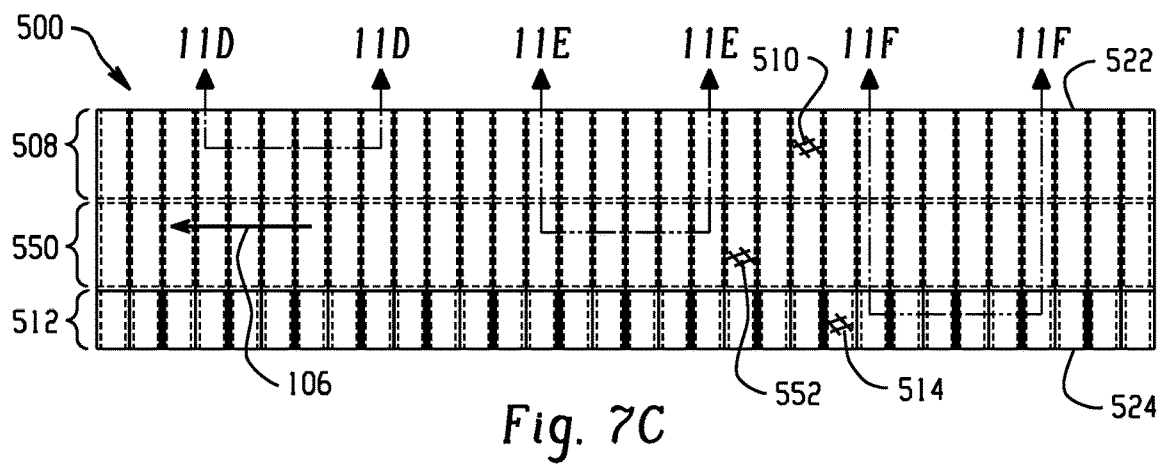
Figure 7D:
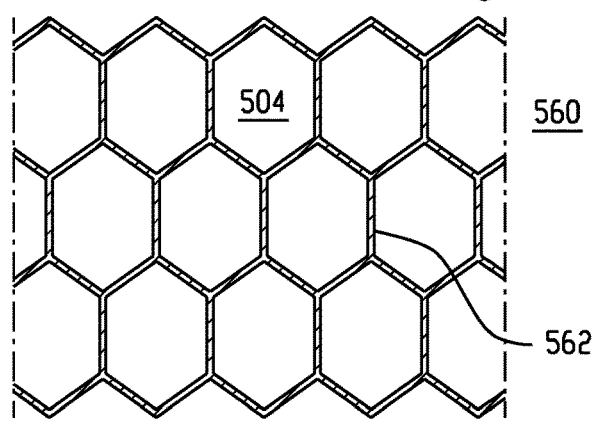
Figure 7E:
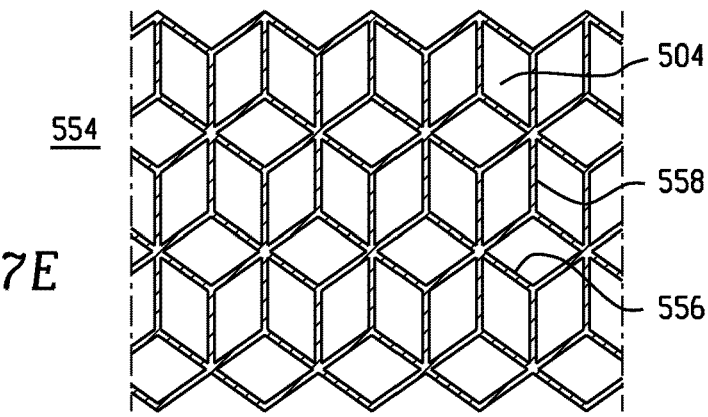
Figure 7F:
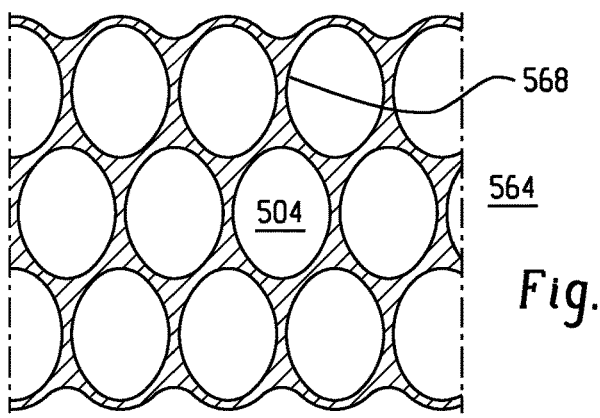

In certain implementations each of the plurality of tubes 504 defines a profile in the intermediate portion 550 that is different than a profile defined by the tube in the inboard portion 508 and the outboard portion 512. For example, as shown in FIGS. 7D-7E, each of the plurality of tubes 504 defines a profile 554 in the intermediate portion 550 having a hexagonal shape 556 with a rib 558 arranged therein, a profile 560 in the inboard portion 508 having a hexagonal shape 562 with no rib, and a profile 564 in the outboard portion 512 having a profile 566 with a circular shape 568. As will be appreciated by those of skill in the art in view of the present disclosure, the different shapes defined by each of the inboard portion 508, and the intermediate portion 550, and the outboard portion 512 provide a graduated bending stiffness between the inboard face 522 and the outboard face 520 of the energy absorbing device 500—allowing for tuning bending stiffness of the energy absorbing device 500 along the depth of the energy absorbing device 500. Though a specific selection of shapes is shown in FIGS. 7A-7F, it is to be understood and appreciated that other shapes can be define within one (or more) of the inboard portion 508, the outboard portion 512, and/or the intermediate portion 550, such as triangular or square shapes, and remain within the scope of the present disclosure.

Figure 8B:
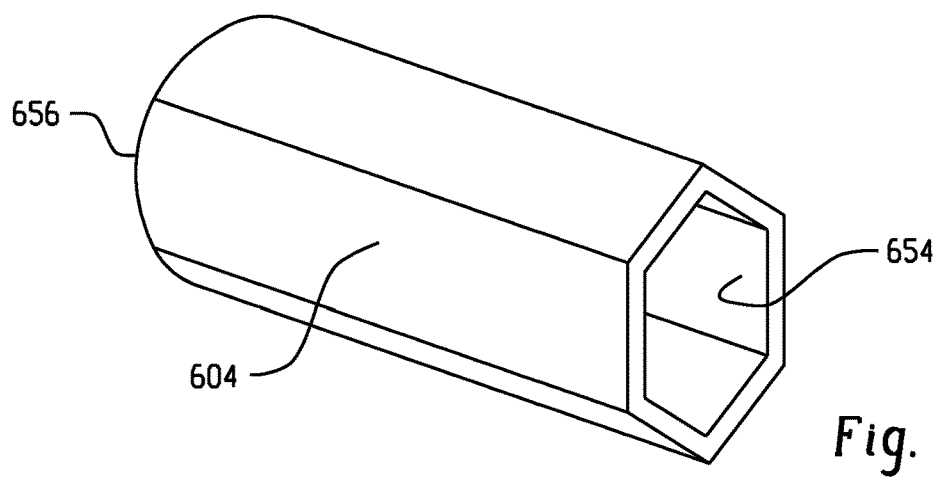
FIGS. 8A-8C are partial perspective and partial elevation views of the energy absorbing device of FIG. 1A, showing an implementation wherein the plurality tubes define different shapes at the inboard face and the outboard, the varying continuously in shape between the inboard face and the outboard face.
Figure 8A:
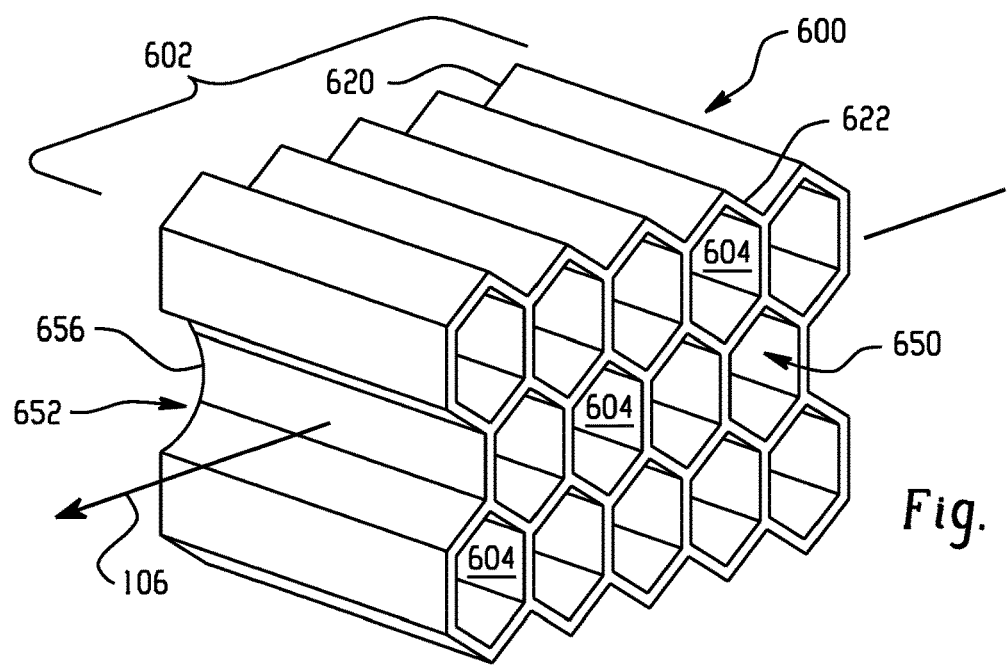
Figure 8C:
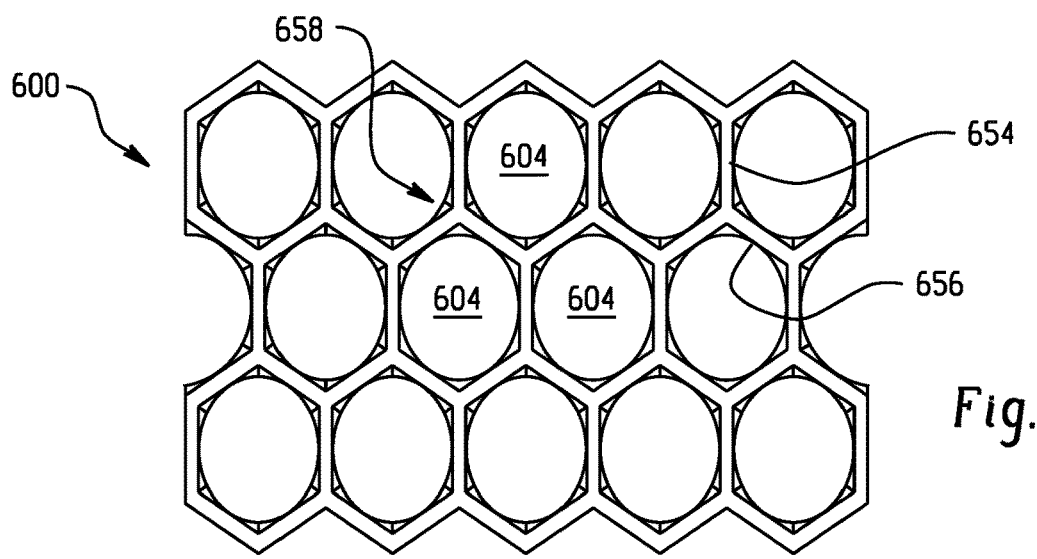

With reference to FIGS. 8A-8C, a portion of an energy absorbing device 600 is shown. The energy absorbing device 600 is similar to the energy absorbing device 100 (shown in FIG. 1A) and additionally includes a honeycomb body 602. The honeycomb body 602 has a plurality of tubes 604 that vary continuously in shape between an inboard profile 650 and an outboard profile 652 of the each of the plurality of tubes 604. In this respect the honeycomb body 602 defines an inboard profile 616 wherein the plurality of tubes 604 define a hexagonal shape 654, e.g., an opening on an inboard face 622 with the hexagonal shape 654, an outboard profile 618 wherein the plurality of tubes 604 define a circular shape 656, an opening on an outboard face 620 with the circular shape 656. As indicated with reference numeral 658, progressive thickening of the tube walls along depths of the plurality of tube 604 between the inboard face 622 and the outboard face 620 changes the bending stiffness of the energy absorbing device 600 continuous through the depth of the energy absorbing device 600. This allows the change in bending stiffness between the inboard face 622 and the outboard face 620 to be selected by both profile shape selection as well as the rate of change in thickness of the walls of the plurality of tubes 604.

Figure 9A:
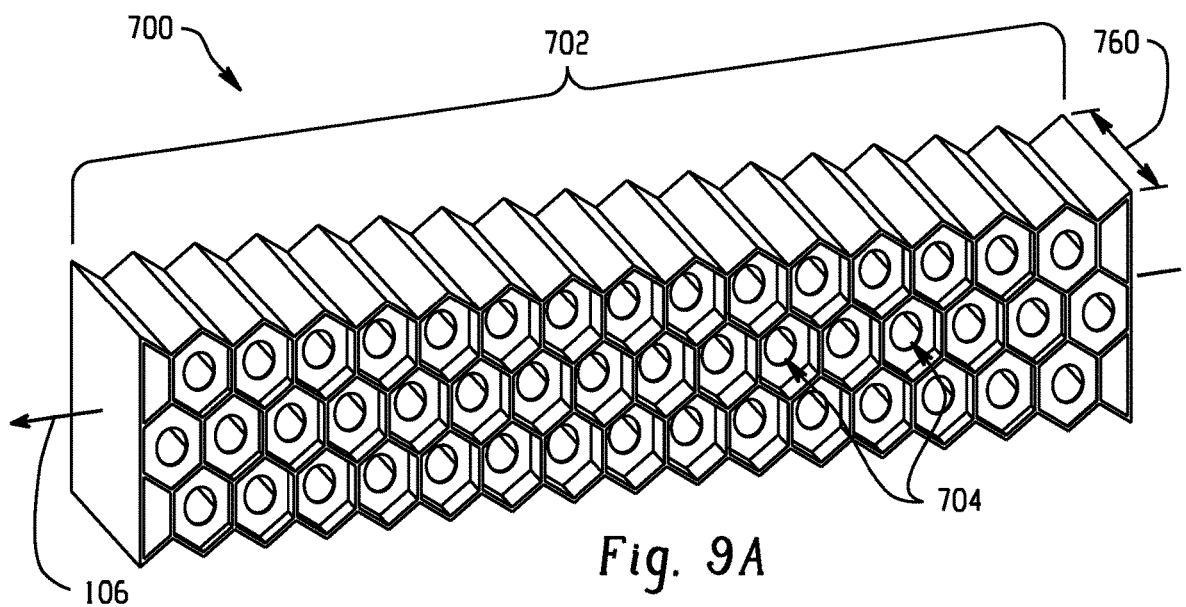
FIGS. 9A and 9B are perspective and plan views of an energy absorbing device according to a further implementation of the energy absorbing device of FIG. 1A, showing an energy absorbing device having outboard portion bending stiffness that varies along the longitudinal length of the energy absorbing device, respectively.
Figure 9B:
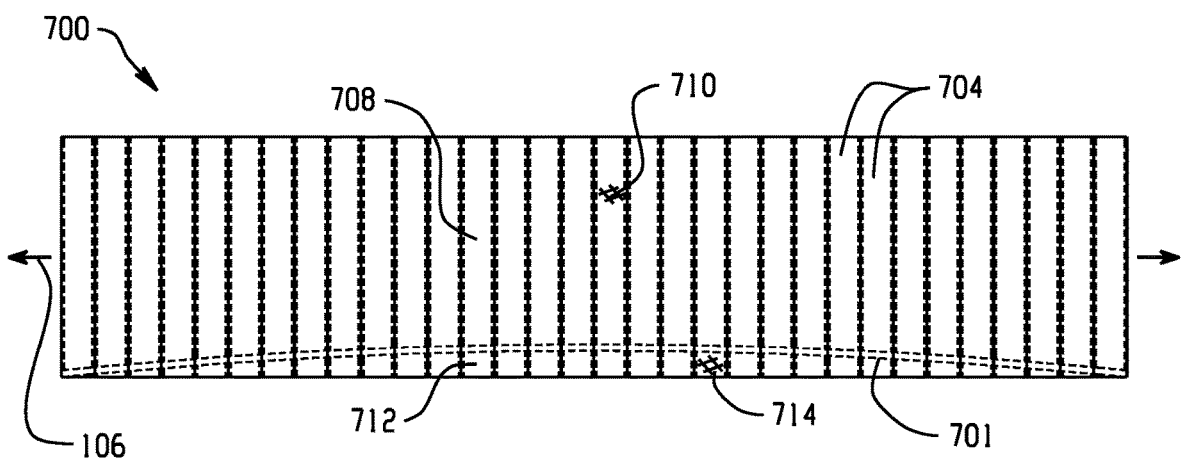

With reference to FIGS. 9A and 9B, an energy absorbing device 700 is shown. The energy absorbing device 700 is similar to the energy absorbing device 100 (shown in FIG. 1A). In this respect the energy absorbing device 700 has a honeycomb body 702 having a plurality of tubes 704, an inboard portion 708, and an outboard portion 712. Along the longitudinal length of the honeycomb body 702 the inboard portion 708 is arranged along the longitudinal axis 106 and has an inboard bending stiffness 710. The outboard portion is arranged outboard of the longitudinal axis 106, is coupled to the inboard portion 708, and has an outboard bending stiffness 714. The outboard bending stiffness 714 is greater than the inboard bending stiffness 710 and additionally that varies along the longitudinal axis 106 according to transition depth 701 within the energy absorbing device 700.

Figure 10A:
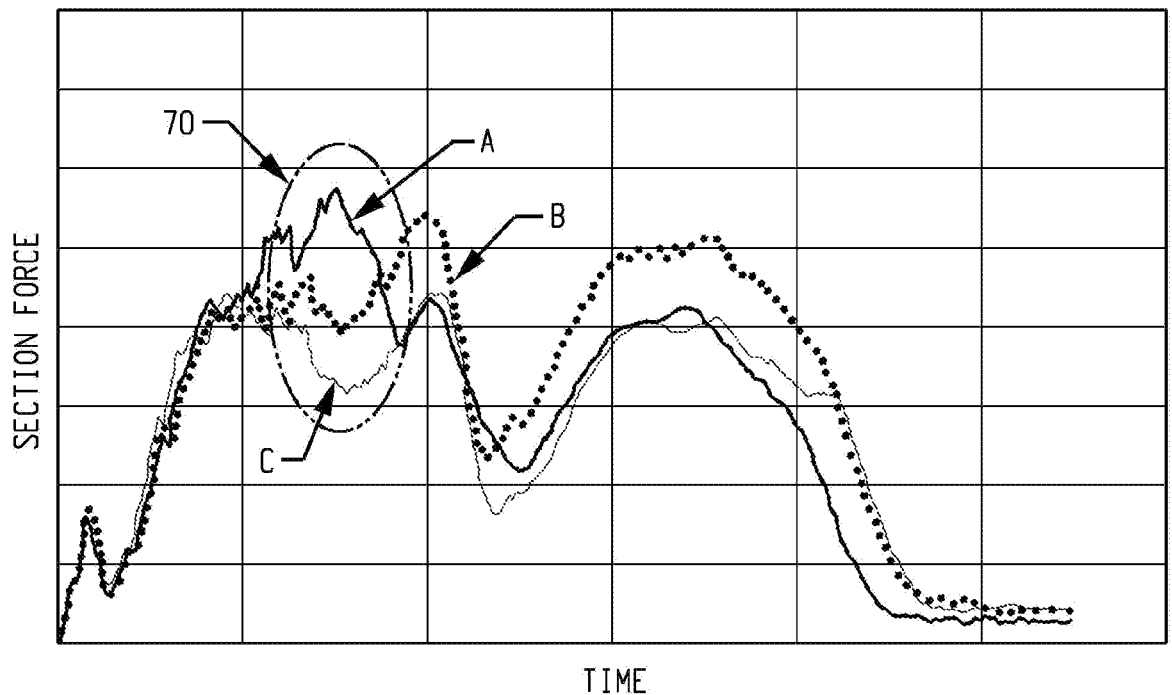
FIGS. 10A and 10B are a graph of section force by longitudinal position and a schematic view of a portion of the vehicle body supporting the energy absorbing device, showing section force varying according to longitudinal position and cooperating with support provided by the crossbar of the vehicle structure, respectively.
Figure 10B:
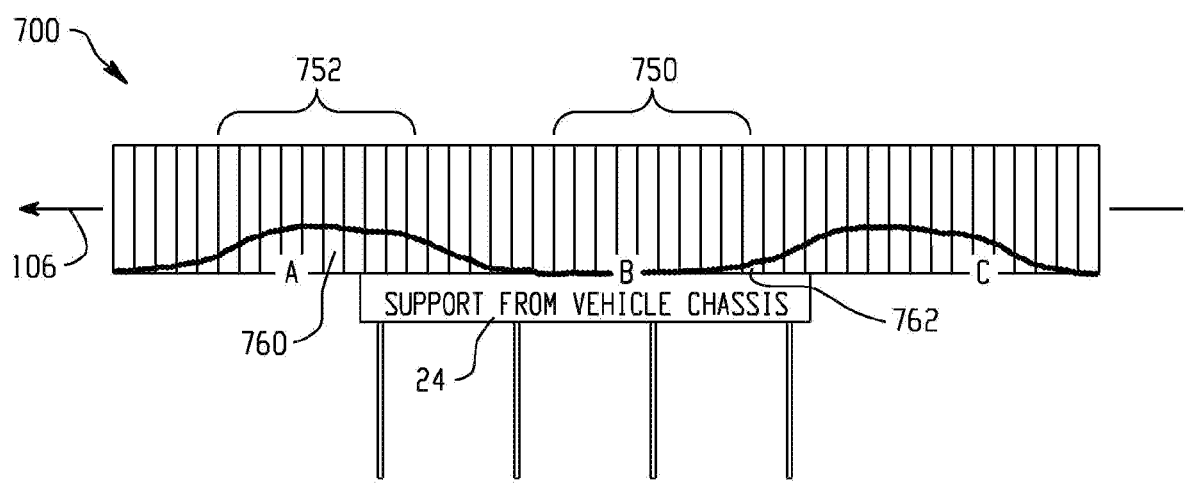

With reference to FIGS. 10A and 10B, the honeycomb body 702 has a first segment 750 and a second segment 752. The second segment 752 is coupled to the first segment 750, is axially offset from the first segment 750 along the longitudinal axis 106, and has outboard portion bending stiffness 760 that is greater than outer portion bending stiffness 762 in the first segment 750. As shown in FIG. 9B, bending stiffness of the energy absorbing device 700 changes according to location of the transition depth 701 along the longitudinal axis 106 within the honeycomb body 702. In the illustrated implementation the transition depth varies continuously between longitudinally opposite ends according to a second order function. This is for illustration purposes and is non-limiting and, as will be appreciated by those of skill in the art in view of the present disclosure, bending stiffness can be selected at various longitudinal positions according to the support provided by structural members 14 (shown in FIG. 1A) forming the vehicle body 10 (shown in FIG. 1). In this respect, as shown in FIG. 10B, the first segment 750 can be located at longitudinal position wherein the crossbar 24 abuts the energy absorbing device 700. This allows the energy absorbing device 700 to be relatively lightweight in comparison to energy absorbing devices constructed with uniform bending stiffness along their longitudinal length, e.g., the energy absorbing device 50 (shown in FIG. 3A), owing to the employment of a lighter construction at locations abutting the crossbar 24. As shown in FIG. 10A, it also allows the peak section force 70 generated by the energy absorbing device 700 to vary according to longitudinal position along the length of the energy absorbing device 700.

As shown in FIGS. 9A and 9B, the plurality of tubes 704 forming the honeycomb body 702 define a hexagonal shape 754 and a hexagonal shape 756 in both the inboard portion 708 and the outboard portion 712 of the honeycomb body 702. Depth 758 of the outboard portion 712 and the inboard portion 708 changes according to longitudinal position. It is contemplated that, in certain implementations, the ratio of the outboard portion depth 758 to the total section depth 760 be selected to limit weight according to support (or absence of support) provided by the crossbar 24 (shown in FIG. 1B) as well as other structure members, e.g., the structural members 14 (shown in FIG. 1A), forming the vehicle body 10 (shown in FIG. 1A).

Figure 11A:
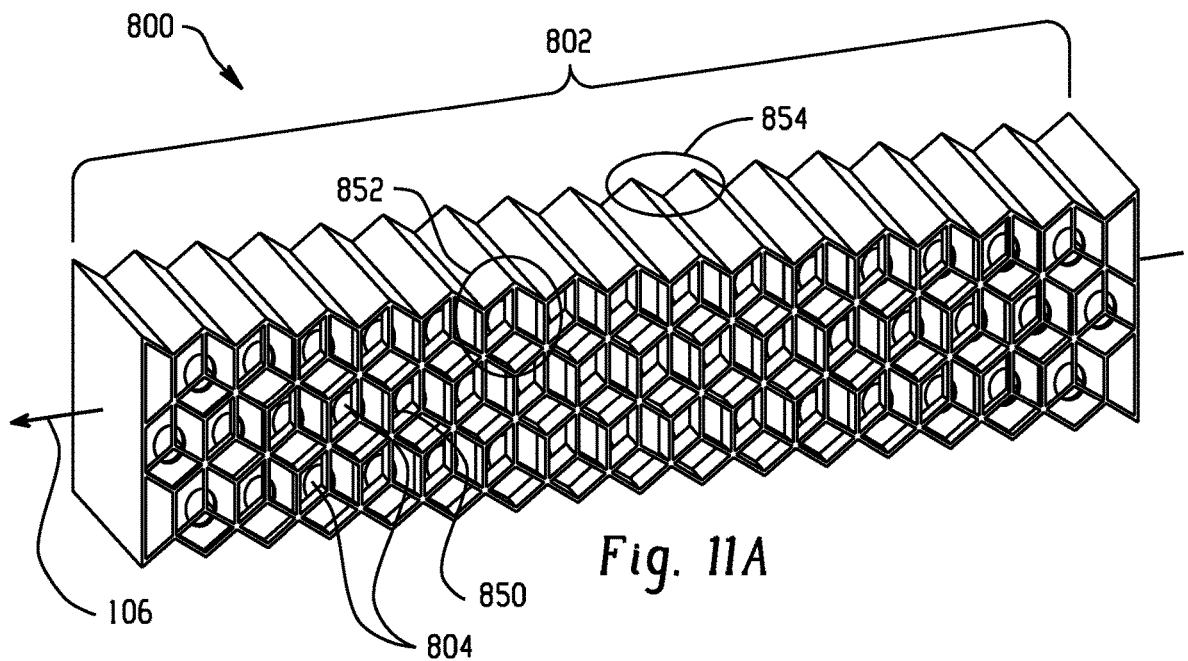
FIGS. 11A and 11B are perspective and plan views of an energy absorbing device according to a further implementation of the energy absorbing device of FIGS. 9A and 9B, showing an energy absorbing device having outboard portion bending stiffness that varies along the longitudinal length of the energy absorbing device according to the depth of ribs arranged within the outer portion of the honeycomb body, respectively.
Figure 11B:
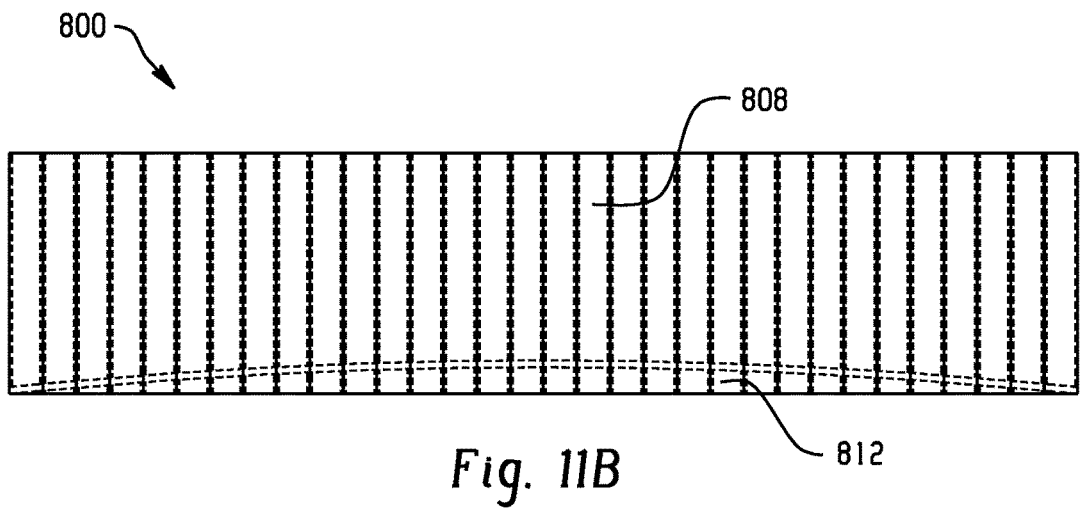

With reference to FIGS. 11A and 11B, an energy absorbing device 800 is shown. The energy absorbing device 800 is similar to the energy absorbing device 700 (shown in FIG. 9A), and additionally includes a honeycomb body 802 having a plurality of tubes 804 with ribs 850 arranged within the plurality of tubes 804. The ribs 850 are arranged within an outboard portion 812 (shown in FIG. 11B) of honeycomb body 802 and extend into the honeycomb body to respective depths that vary according to longitudinal position along the longitudinal axis 106. As shown in FIG. 11A the plurality of tubes 804 define a hexagonal shape 852 in the outboard portion 812 of the honeycomb body 802 and a hexagonal shape 854 in an inboard portion 808 of the honeycomb body 802. Although a particular rib structure, e.g., the rib 850, is shown and described in FIG. 11A and FIG. 11B, it is to be understood and appreciated that rib structures of other shapes can be disposed within the plurality of tubes 804, and truncated with respect to the depth of the plurality of tubes 804, to impart the desired crushing resistance of the honeycomb body 802.

Figure 12A:
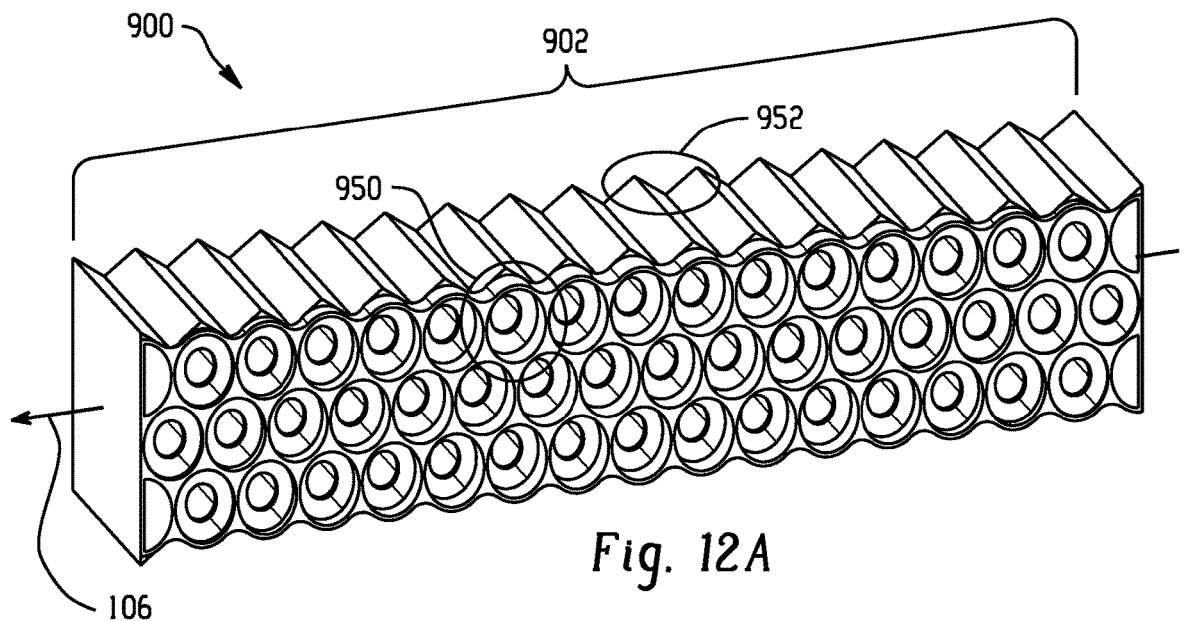
FIGS. 12A and 12B are perspective and plan views of an energy absorbing device according to a further implementation of the energy absorbing device of FIGS. 9A and 9B, showing an energy absorbing device having outboard portion bending stiffness that varies along the longitudinal length of the energy absorbing device according to the depth of circular profiles defined by the outer portion of the honeycomb body, respectively.
Figure 12B:
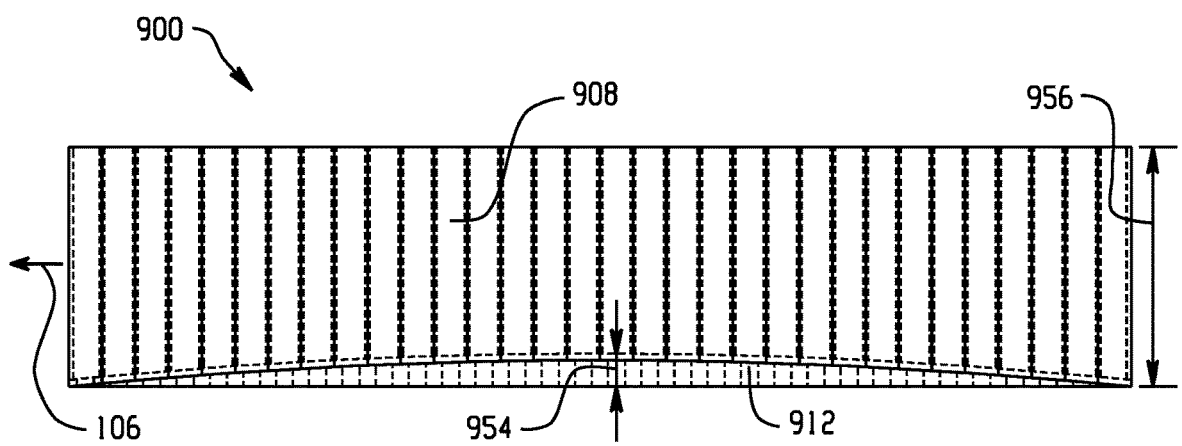

With reference to FIGS. 12A and 12B, an energy absorbing device 900 is shown. The energy absorbing device 900 is similar to the energy absorbing device 700 (shown in FIG. 9A), and additionally includes a honeycomb body 902 having a plurality of tubes 904 defining a circular shape 950 in an outboard portion 912 of the honeycomb body 902 and a hexagonal shape 952 in an inboard portion 908 of the honeycomb body 902. The depth at which the plurality of tubes 904 transition differs according to longitudinal position to define a ratio of an outer portion depth 954 to total section depth 956 according to the support provided by the crossbar 24 (shown in FIG. 1B), enabling tuning and limiting weight of the energy absorbing device 900. Tubes with a circular shape, e.g., the plurality of tubes 904 defining the circular shape 950, impart the portion of the honeycomb body 902 having the tubes with greater crush resistance than honeycomb portions with the same inscribed dimension and having a finite number of sides, allowing the portion to preferentially crush subsequent to portions having profiles with a finite number of sides.

Figure 13A:
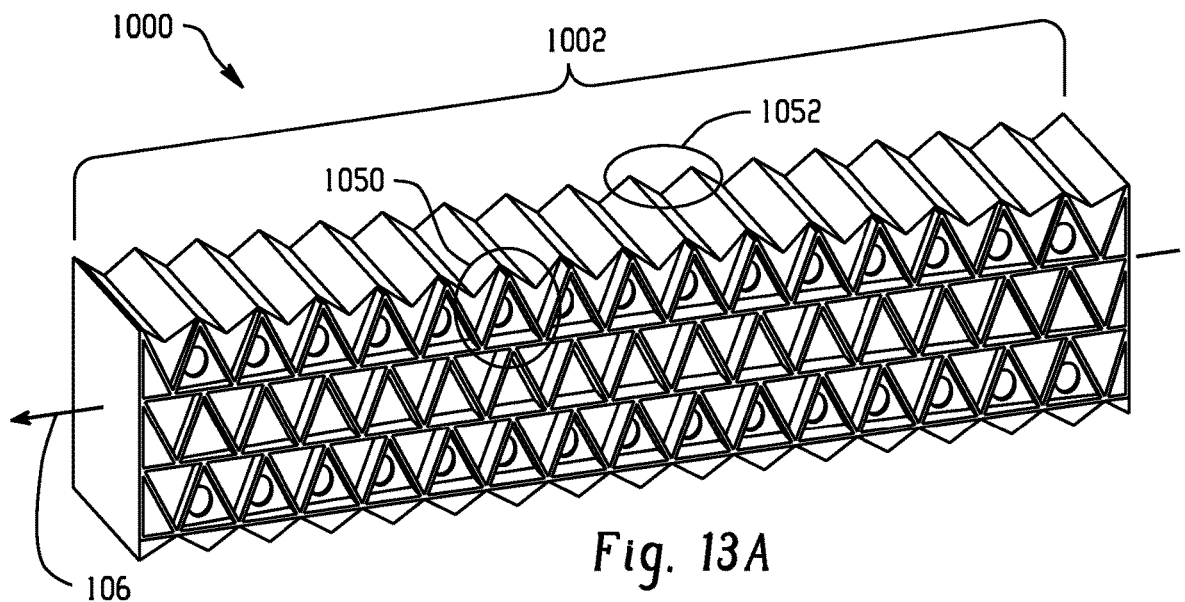
FIGS. 13A and 13B are perspective and plan views of an energy absorbing device according to a further implementation of the energy absorbing device of FIGS. 9A and 9B, showing an energy absorbing device having outboard portion bending stiffness that varies along the longitudinal length of the energy absorbing device according the depth of triangular profiles defined by the outer portion of the honeycomb body, respectively.
Figure 13B:
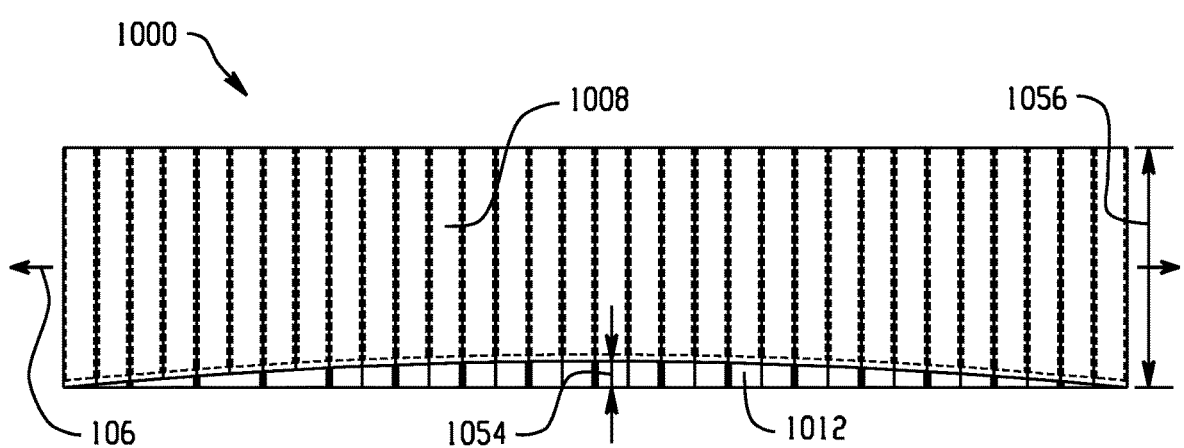

With reference to FIGS. 13A and 13B, an energy absorbing device 1000 is shown. The energy absorbing device 1000 is similar to the energy absorbing device 700 (shown in FIG. 9A), and additionally includes a honeycomb body 1002 having a plurality of tubes 1004 defining a triangular shape 1050 in an outboard portion 1012 of the honeycomb body 1002 and a hexagonal shape 1052 in an inboard portion 1008 of the honeycomb body 1002. The depth at which the plurality of tubes 904 transition differs according to longitudinal position to define a ratio of an outer portion depth 1054 to total section depth 1056 according to the support provided by the crossbar 24 (shown in FIG. 1B), enabling tuning and limiting weight of the energy absorbing device 1000. Tubes with a triangular shape, e.g., the plurality of tubes 1004 defining the triangular shape 1050, impart the portion of the honeycomb body 1002 having the tubes with less crush resistance than honeycomb portions with the same inscribed dimension and having a greater number of sides, allowing the portion to preferentially crush prior to portions having profiles with more than three sides.

This disclosure encompasses the following implementations.

Implementation 1. An energy absorbing device includes a honeycomb body having two or more tubes stacked transversely with one another along a longitudinal axis. The honeycomb body includes an inboard portion and an outboard portion. The inboard portion of the honeycomb body is arranged inboard of the longitudinal axis and has an inboard portion bending stiffness. The outboard portion of the honeycomb body is arranged outboard of the longitudinal axis, is coupled to the inboard portion of the honeycomb body, and has an outboard portion bending stiffness. The outboard portion bending stiffness of the outboard portion is greater than the inboard portion bending stiffness of the inboard portion.

Implementation 2. The energy absorbing device of implementation 1, wherein the plurality of tubes span the inboard portion and the outboard portion of the honeycomb body, the plurality of tubes defining an inboard profile in the inboard portion of the honeycomb body, the plurality of tubes defining an outboard profile in the outboard portion of the honeycomb body, the outboard profile different than the inboard profile.

Implementation 3. The energy absorbing device of implementation 2, wherein the outboard profile has a hexagonal shape with a rib arranged therein, wherein the inboard profile has a hexagonal shape without a rib arranged therein.

Implementation 4. The energy absorbing device of implementation 2, wherein the outboard profile has a circular shape, wherein the inboard profile has a hexagonal shape.

Implementation 5. The energy absorbing device of implementation 2, wherein the outboard profile has a square shape, wherein the inboard profile has a hexagonal shape.

Implementation 6. The energy absorbing device of implementation 2, wherein the outboard profile has a triangular shape, wherein the inboard profile has a hexagonal shape.

Implementation 7. The energy absorbing device of implementation 2, wherein the plurality of tubes vary continuously in shape from the outboard profile to the inboard profile.

Implementation 8. The energy absorbing device of any or more of implementations 1 to 6, wherein the honeycomb further comprises an intermediate portion coupling the inboard portion of the honeycomb body with the outboard portion of the honeycomb body, wherein the intermediate portion has an intermediate portion bending stiffness, the intermediate portion bending stiffness less than the outboard portion bending stiffness.

Implementation 9. The energy absorbing device of implementation 8, wherein each of the plurality of tubes span the inboard portion, the intermediate portion, and the outboard portion of the honeycomb body.

Implementation 10. The energy absorbing device of any one or more of the preceding implementations, wherein each of the plurality of tubes define a profile in the intermediate portion that is different than a profile of the plurality of tubes in the outboard portion or inboard portion of the honeycomb body.

Implementation 11. The energy absorbing device of any one or more of the preceding implementations, wherein the plurality of tubes define a circular shape in the outboard portion of the honeycomb body, wherein the plurality of tubes define a hexagonal shape in the inboard portion of the honeycomb body, and wherein the plurality of tubes define a hexagonal shape in the intermediate portion of the honeycomb body with a ribs arranged only within the intermediate portion of the honeycomb body.

Implementation 12. The energy absorbing device of any one or more of the preceding implementations wherein the honeycomb body further comprises a first segment with a first segment bending stiffness, and a second segment connected to the first segment and axially offset therefrom along the longitudinal axis, the second segment having a second segment stiffness that is greater than first segment bending stiffness.

Implementation 13. The energy absorbing device of implementation 12, wherein outboard portion depths of tubes forming the second segment is greater than inboard portion depths of tubes forming the first segment of the honeycomb body.

Implementation 14. The energy absorbing device of any of the preceding implementations, wherein the energy absorbing device is formed from a polymeric material.

Implementation 15. The energy absorbing device of any of the preceding implementations, wherein the energy absorbing device is formed using an injection molding technique.

Implementation 16. The energy absorbing device of one or more of the implementations of 1 to 14, wherein the energy absorbing device is formed using an additive manufacturing technique.

Implementation 17. A structural member for a vehicle body comprising a plate member: a facia member connected to the plate member, the facia member the plate member defining therebetween a cavity; and an energy absorbing device as in any one or more of the preceding claims. The energy absorbing device is supported within, the cavity, the inboard portion of the honeycomb body abutting the plate member, wherein the honeycomb further comprises an intermediate portion coupling the inboard portion of the honeycomb body with the outboard portion of the honeycomb body, wherein the intermediate portion has an intermediate portion bending stiffness, the intermediate portion bending stiffness less than the outboard portion bending stiffness of the honeycomb body.

Implementation 18. A vehicle body comprising a structural member selected from a group including a pillar, a floor rocker, a roof rail, a rail extension, and a bumper beam, the structural member comprising a plate member; a facia member connected to the plate member, the facia member the plate member defining therebetween a cavity: and an energy absorbing device of one or more of implementations 1 to 16 supported within the cavity, the inboard portion of the honeycomb body abutting the plate member. The honeycomb body further comprises a first segment with a first segment bending stiffness, a second segment connected to the first segment and axially offset therefrom along the longitudinal axis, the second segment having a second segment stiffness that is greater than first segment bending stiffness; and a support member abutting the plate member at location adjacent to the first segment of the energy absorbing device, wherein no support member abuts the plate member at a location adjacent to the second segment of the energy absorbing device.

The illustrated implementations are disclosed with reference to the drawings. However, it is to be understood that the disclosed implementations are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

The terms "first," "second," and the like, do not denote any order, quantity, or importance, but rather are used to distinguish one element from another. The terms "a" and "an" and "the" do not denote a limitation of quantity and are to be construed to cover both the singular and the plural, unless otherwise indicated herein or clearly contradicted by context. "Or" means "and/or" unless clearly stated otherwise. Reference throughout the specification to "some implementations", "an implementation", and so forth, means that a particular element described in connection with the implementation is included in at least one implementation described herein, and may or may not be present in other implementations. In addition, it is to be understood that the described elements may be combined in any suitable manner in the various implementations. A "combination thereof" is open and includes any combination comprising at least one of the listed components or properties optionally together with a like or equivalent component or property not listed.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular implementations have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A structural member for a vehicle body, comprising:
a plate member;
a facia member connected to the plate member, the facia member and the plate member defining therebetween a cavity that extends along a longitudinal axis; and
an energy absorbing device within the cavity, the energy absorbing device comprising:
a honeycomb body having a plurality tubes stacked transversely with one another along the longitudinal axis, the honeycomb body comprising:
an inboard portion arranged along the longitudinal axis and having an inboard portion bending stiffness; and
an outboard portion arranged outboard of the longitudinal axis and coupled to the inboard portion of the honeycomb body, the outboard portion having an outboard portion bending stiffness,
wherein the outboard portion bending stiffness of the honeycomb body is greater than the inboard portion bending stiffness of the honeycomb body; and
wherein the inboard portion of the honeycomb body abuts the plate member.

2. The structural member as recited in claim 1, wherein the plurality of tubes:
span the inboard portion and the outboard portion of the honeycomb body;
define an inboard profile in the inboard portion of the honeycomb body; and
define an outboard profile in the outboard portion of the honeycomb body,
wherein the outboard profile of each of the plurality of tubes different than the inboard profile of each of the plurality of tubes.

3. The structural member as recited in claim 2, wherein the outboard profile has one or more of:
a hexagonal shape with a rib arranged therein, wherein the inboard profile has a hexagonal shape with no rib arranged therein;
a circular shape, wherein the inboard profile has a hexagonal shape; and
a triangle shape, wherein the inboard profile has a hexagonal shape.

4. The structural member as recited in claim 2, wherein the plurality of tubes vary continuously in shape from the outboard profile to the inboard profile.

5. The structural member as recited in claim 1, wherein the honeycomb body further comprises an intermediate portion coupling the inboard portion of the honeycomb body with the outboard portion of the honeycomb body, wherein the intermediate portion has an intermediate portion bending stiffness, the intermediate portion bending stiffness is less than the outboard portion bending stiffness.

6. The structural member as recited in claim 5, wherein each of the plurality of tubes spans the inboard portion, the intermediate portion, and the outboard portion of the honeycomb body.

7. The structural member as recited in claim 5, wherein each of the plurality of tubes define a profile in the intermediate portion that is different than a profile defined the tube in the outboard portion or in the inboard portion of the honeycomb body.

8. The structural member as recited in claim 5, wherein the plurality of tubes define:
a circular shape in the outboard portion of the honeycomb body;
a hexagonal shape in the inboard portion of the honeycomb body;
a hexagonal shape in the intermediate portion of the honeycomb body with a rib arranged respective tubes in the intermediate portion of the honeycomb body.

9. The structural member as recited in claim 1, wherein the honeycomb body is further defined by:
a first segment with an outer portion bending stiffness;
a second segment adjacent to the first segment and axially offset therefrom along the longitudinal axis, the second segment having an outboard portion bending stiffness that is greater than the outer portion bending stiffness.

10. The structural member as recited in claim 9, wherein outboard portion depths of tubes forming the second segment is greater than inboard portion depths of tubes forming the first segment of the honeycomb body.

11. A vehicle body, comprising:
the structural member of claim 1, wherein the structural member is selected from a group including a pillar, a floor rocker, a roof rail, a rail extension, and a pillar, wherein the honeycomb body is further defined by:
a first segment with an outer portion bending stiffness;
a second segment adjacent to the first segment and axially offset therefrom along the longitudinal axis, the second segment having an outboard portion bending stiffness that is greater than the outer portion first bending stiffness; and
a support abutting the plate member at a location adjacent to the first segment of the energy absorbing device,
wherein no support abuts at least a portion of the plate member at a location adjacent to the second segment of the energy absorbing device.

12. An energy absorbing device, comprising:
a honeycomb body having a plurality tubes stacked transversely with one another along a longitudinal axis, the honeycomb body comprising:
an inboard portion arranged along the longitudinal axis and having an inboard portion bending stiffness and
an outboard portion arranged outboard of the longitudinal axis and coupled to the inboard portion of the honeycomb body, the outboard portion having an outboard portion bending stiffness,
wherein the outboard portion bending stiffness of the honeycomb body is greater than the inboard portion bending stiffness of the honeycomb body; and
the honeycomb body is further defined by:
a first segment with an outer portion bending stiffness;
a second segment adjacent to the first segment and axially offset therefrom along the longitudinal axis,
the second segment having an outboard portion bending stiffness that is greater than outer portion bending stiffness.

13. The energy absorbing device as recited in claim 12, wherein
the plurality of tubes:
span the inboard portion and the outboard portion of the honeycomb body;
define an inboard profile in the inboard portion of the honeycomb body; and
define an outboard profile in the outboard portion of the honeycomb body,
wherein the outboard profile of each of the plurality of tubes is different than the inboard profile of each of the plurality of tubes.

14. The energy absorbing device as recited in claim 13, wherein the outboard profile has one or more of:
a hexagonal shape with a rib arranged therein, wherein the inboard profile has a hexagonal shape with no rib arranged therein;
a circular shape, wherein the inboard profile has a hexagonal shape; and
a triangular shape, wherein the inboard profile has a hexagonal shape.

15. The energy absorbing device as recited in claim 13, wherein the plurality of tubes vary continuously in shape from the outboard profile to the inboard profile.

16. The energy absorbing device as recited in claim 12, wherein
the honeycomb body further comprises an intermediate portion coupling the inboard portion of the honeycomb body with the outboard portion of the honeycomb body,
wherein the intermediate portion has an intermediate portion bending stiffness, the intermediate portion bending stiffness is less than the outboard portion bending stiffness.

17. The energy absorbing device as recited in claim 16, wherein each of the plurality of tubes spans the inboard portion, the intermediate portion, and the outboard portion of the honeycomb body.

18. The energy absorbing device as recited in claim 16, wherein each of the plurality of tubes define a profile in the intermediate portion that is different than a profile defined the tube in the outboard portion or in the inboard portion of the honeycomb body.

19. The energy absorbing device as recited in claim 16, wherein the plurality of tubes define:
a circular shape in the outboard portion of the honeycomb body;
a hexagonal shape in the inboard portion of the honeycomb body; and
a hexagonal shape in the intermediate portion of the honeycomb body with a rib arranged respective tubes in the intermediate portion of the honeycomb body.

20. The energy absorbing device as recited in claim 12, wherein outboard portion depths of tubes forming the second segment is greater than inboard portion depths of tubes forming the first segment of the honeycomb body.

* * * * *